(12) United States Patent
Van Engelhoven et al.

(10) Patent No.: US 12,029,699 B2
(45) Date of Patent: Jul. 9, 2024

(54) REMOTE CENTER SHOULDER JOINT FOR SHOULDER SUPPORTING EXOSKELETON

(71) Applicant: suitX, Inc., Emeryville, CA (US)

(72) Inventors: Logan Van Engelhoven, Emeryville, CA (US); James Hatch, Emeryville, CA (US)

(73) Assignee: suitX, Inc., Emeryville, CA (US)

( * ) Notice: Subject to any disclaimer, the term of this patent is extended or adjusted under 35 U.S.C. 154(b) by 636 days.

(21) Appl. No.: 17/206,814

(22) Filed: Mar. 19, 2021

(65) Prior Publication Data

US 2021/0290469 A1 Sep. 23, 2021

Related U.S. Application Data

(60) Provisional application No. 62/991,684, filed on Mar. 19, 2020.

(51) Int. Cl.
*A61H 1/02* (2006.01)
*B25J 9/00* (2006.01)

(52) U.S. Cl.
CPC .......... *A61H 1/0281* (2013.01); *B25J 9/0006* (2013.01); *A61H 2201/165* (2013.01); *A61H 2201/1671* (2013.01)

(58) Field of Classification Search
CPC ............ A61H 1/0281; A61H 2201/165; A61H 2201/1671; A61H 2201/1207; A61H 1/0296; A61H 2201/1609; A61H 2201/1616; A61H 2201/5053; B25J 9/0006; B25J 9/0048
See application file for complete search history.

(56) References Cited

U.S. PATENT DOCUMENTS

| | | |
|---|---|---|
| 741,382 A | 10/1903 | Seifried |
| 4,298,149 A | 11/1981 | Gottschalk et al. |
| RE32,213 E | 7/1986 | Brown |

(Continued)

FOREIGN PATENT DOCUMENTS

| | | |
|---|---|---|
| CN | 107835675 A | 3/2018 |
| EP | 3297579 A4 | 3/2019 |

(Continued)

OTHER PUBLICATIONS

U.S. Non-Final Office Action mailed May 31, 2017 cited in U.S. Appl. No. 15/158,113, 15 pgs.

(Continued)

*Primary Examiner* — Camtu T Nguyen
(74) *Attorney, Agent, or Firm* — Polygon IP, LLP

(57) ABSTRACT

A remote center joint 1 is configured to rotate segment 7 relative to segment 2 along axis 15. Remote center joint 1 comprises a segment 3 coupled to base segment 2 along axis 16. Segment 4 is coupled to segment 3 about axis 17 intersecting axis 16 at first point 22. Segment 4 is coupled to segment 7 about axis 18 intersecting first point 22. Segment 5 is coupled to segment 2 about axis 19 parallel to axis 16. Segment 5 is geared to segment 3. Segment 6 is coupled to segment 5 about axis 20 intersecting axis 19 at second point 23. Segment 6 is coupled to segment 7 along axis 21 intersecting second point 23. Segment 6 is geared to segment 4. Axis 15 of rotation of terminal segment 7 relative to segment 2 connects first point 22 and second point 23.

30 Claims, 18 Drawing Sheets

(56) References Cited

U.S. PATENT DOCUMENTS

| | | | |
|---|---|---|---|
| 4,976,387 A | 12/1990 | Spianti | |
| 5,042,763 A | 8/1991 | Wong | |
| 5,111,983 A | 5/1992 | Simmons et al. | |
| 6,301,526 B1 | 10/2001 | Kim et al. | |
| 6,764,231 B1 | 7/2004 | Shubert | |
| 6,821,259 B2 | 11/2004 | Rahman et al. | |
| 7,325,777 B2 | 2/2008 | Thiessen | |
| 7,618,016 B2 | 11/2009 | Brown | |
| 7,862,524 B2 * | 1/2011 | Carignan | B25J 17/025 |
| | | | 601/5 |
| 8,585,017 B2 | 11/2013 | Garceau | |
| 8,641,782 B2 | 2/2014 | Kim et al. | |
| 8,939,924 B1 * | 1/2015 | Paulos | A61F 5/01 |
| | | | 602/5 |
| 8,968,222 B2 | 3/2015 | Kazerooni et al. | |
| 9,204,730 B2 | 12/2015 | Brown | |
| 9,205,017 B2 | 12/2015 | Doyle | |
| 9,333,644 B2 | 5/2016 | Angold | |
| 9,404,618 B2 | 8/2016 | Brown et al. | |
| 9,889,554 B2 | 2/2018 | Van Engelhoven et al. | |
| 10,071,477 B2 | 9/2018 | Van Engelhoven et al. | |
| 10,124,485 B2 | 11/2018 | Van Engelhoven et al. | |
| 10,154,729 B2 * | 12/2018 | Blackburn | F16M 13/02 |
| 10,369,690 B2 | 8/2019 | Van Engelhoven et al. | |
| 10,391,627 B2 | 8/2019 | Van Engelhoven et al. | |
| 10,569,413 B2 * | 2/2020 | Angold | A61H 1/0274 |
| 10,639,785 B2 | 5/2020 | Van Engelhoven et al. | |
| 10,786,896 B2 | 9/2020 | Van Engelhoven et al. | |
| 2013/0261524 A1 * | 10/2013 | Barnes | A61F 5/05875 |
| | | | 602/22 |
| 2014/0158839 A1 | 6/2014 | Doyle | |
| 2015/0001269 A1 | 1/2015 | Sacksteder | |
| 2016/0339583 A1 | 11/2016 | Van Engelhoven et al. | |
| 2017/0189257 A1 * | 7/2017 | Lan | A63B 21/4017 |
| 2017/0224516 A1 | 8/2017 | Bonutti et al. | |
| 2018/0111262 A1 | 4/2018 | Van Engelhoven et al. | |
| 2018/0111263 A1 | 4/2018 | Van Engelhoven et al. | |
| 2019/0039234 A1 | 2/2019 | Van Engelhoven et al. | |
| 2019/0143503 A1 | 5/2019 | Van Engelhoven et al. | |
| 2019/0175453 A1 | 6/2019 | Sasaki et al. | |
| 2019/0321965 A1 | 10/2019 | Van Engelhoven et al. | |
| 2020/0223057 A1 | 7/2020 | Van Engelhoven et al. | |
| 2020/0376651 A1 | 12/2020 | Van Engelhoven et al. | |

FOREIGN PATENT DOCUMENTS

| | | |
|---|---|---|
| JP | 2018520011 A | 7/2018 |
| KR | 1020180053276 A | 5/2018 |
| WO | 2013186705 A1 | 12/2013 |
| WO | 2015058249 A1 | 4/2015 |
| WO | 2019016629 A1 | 1/2019 |
| WO | 2019076417 A1 | 4/2019 |
| WO | 2020216425 A1 | 10/2020 |
| WO | 2021188950 A1 | 9/2021 |

OTHER PUBLICATIONS

European Search Report dated Feb. 1, 2019 cited in Application No. 16815513.3, 6 pgs.

Chinese Office Action dated Mar. 18, 2019 cited in Application No. 2016800410520, 36 pgs.

Morita et al., "A novel mechanism design for gravity compensation in three dimensional space," Proc. 2003 IEEE/ASME Int. Conf. Adv. Intell. Mechatronica (AIM 2003), vol. 1, 2003, pp. 163-168.

Rahman et al., "A Simple Technique to Passively Gravity-Balance Articulated Mechanisms," Transaction of the ASEM, Journal of Mechanical Design, vol. 117, 1995, pp. 655-658.

PCT Application No. PCT/US2021/23235 filed Mar. 19, 2021 entitled "Remote Center Shoulder Joint for Shoulder Supporting Exoskeleton", Applicant: U.S. Bionics Inc. (DBA:suitX).

International Search Report and Written Opinion dated Jun. 8, 2021 cited in Application No. PCT/US21/23235, 7 pgs.

\* cited by examiner

REMOTE CENTER SHOULDER JOINT FOR SHOULDER SUPPORTING EXOSKELETON

RELATED APPLICATION

Under provisions of 35 U.S.C. § 119(e), the Applicant claims the benefit of U.S. Provisional Application No. 62/991,684 filed Mar. 19, 2020, which is incorporated herein by reference.

It is intended that each of the referenced application may be applicable to the concepts and embodiments disclosed herein, even if such concepts and embodiments are disclosed in the referenced applications with different limitations and configurations and described using different examples and terminology.

GOVERNMENT LICENSE RIGHTS

This invention was made with Government support under FA8222-21-C-0001 awarded by the Department of the Air Force. The Government has certain rights in the invention.

FIELD OF DISCLOSURE

The present invention pertains to the art of supporting exoskeleton devices for the human body, and more particularly, a remote center joint that can create a passive degree of freedom while transferring supportive forces.

BACKGROUND

Mechanisms comprising a six-bar arrangement with two sets of intermeshing gears have been utilized to support horizontal or vertical loads for applications such as scissor jacks. These mechanisms have been limited to supporting linear motion. Other mechanisms, especially in the field of exoskeletons and robotics, require at least one degree of rotational freedom with a remote center so that the hardware can work around an object while maintaining an axis passing through that object. Spherical mechanisms are a common solution to this problem, utilizing curved segments rotating along axes that coincide about a single remote center of motion. These mechanisms, if passive, have been configured as 4-bar scissors type segments that form the sides of a parallelogram or rhombus and move along the surface of a sphere originating at the common remote center of motion. At each end of the curved segment assembly, a revolute joint rotates orthogonally to the remote axis to create $2^{nd}$ and $3^{rd}$ degrees of freedom coinciding with the remote center of motion. If only a single degree of freedom about the remote axis is required or if a load is to be supported, the proximal and distal revolute joints of the parallelogram must be constrained to keep the mechanism from collapsing. This is done either by actuated means or by a motion controlling mechanism that adds additional segments and a prismatic joint to the assembly. It would be beneficial to have a remote center mechanism capable of rotational motion that can support applied loads about the remote axis without the added complexities inherent in the prior art.

SUMMARY

The present disclosure is directed to a remote center mechanism configured to create one degree of freedom between a base segment and a terminal segment while passively supporting an applied load. The mechanism utilizes six segments (vs four) in a hexagonal shape whose joints coincide at two remote centers of motion (vs 1 RCM) to create a remote rotational axis (vs remote point). The mechanism thus rotates about an imaginary cylindrical shell rather than a spherical one. Instead of all the segments being curved, both the base segment and the terminal segment are planar and are coupled to a set of segments along parallel rotational axes that do not intersect. At both the base segment and the terminal segment, each set of segments may be geared together in order to constrain the mechanism to one degree of freedom and resist applied loads. A primary embodiment of this mechanism is used in a shoulder supporting exoskeleton to create passive horizontal motion about the shoulder joint. Throughout its range of motion, the mechanism minimizes the profile of the device while transferring the loads from a torque generator located alongside the arm to a torso frame.

In an embodiment, a remote-center joint comprises a base segment, a terminal segment coupled, a first segment and a third segment each rotatably coupled to the base segment about parallel axes, wherein the first segment and the third segment are geared together, a second segment and a fourth segment each rotatably coupled to the terminal segment about parallel axes, wherein the second segment and the fourth segment are geared together, wherein the second segment is rotatably coupled to the first segment and the third segment is rotatably coupled to the fourth segment such that the remote center joint rotates the terminal segment relative to the base segment about an imaginary axis that does not pass through any mechanical joint. When the imaginary axis is parallel to a gravity line, the remote center joint transfers a weight of or attached to the terminal segment to the base segment without affecting motion of the terminal segment relative to the base segment about the imaginary axis. When a force or torque is applied to the terminal segment, reaction forces that do not apply a moment about the imaginary axis are transferred from the terminal link through the remote center joint to the base link without causing relative motion of the base link relative to the terminal link about the imaginary axis.

In another embodiment, a remote-center joint for an arm supporting exoskeleton comprises a base segment coupled to a torso frame of the arm supporting exoskeleton, wherein the torso frame is configured to be coupled to a torso of a person, a terminal segment coupled to an arm segment of the arm supporting exoskeleton, wherein the arm segment is configured to be coupled to an arm of the person, a first segment rotatably coupled to the base segment along a first axis, a second segment rotatably coupled to the first segment about a second axis, and rotatably coupled to the terminal segment about a third axis, wherein the first axis, second axis, and third axis intersect at a first point, a third segment rotatably coupled to the base segment along a fourth axis parallel to the first axis, wherein the third segment and the first segment are provided with a first set of intermeshing gears, and a fourth segment rotatably coupled to the third segment along a fifth axis, and rotatably coupled to the terminal segment along a sixth axis parallel to the third axis, wherein the fourth axis, fifth axis, and sixth axis intersects at a second point, and wherein the fourth segment and the second segment are provided with a second set of intermeshing gears, wherein the remote center joint rotates the arm segment relative to the torso frame about an imaginary axis connecting the first point and the second point crosses approximately through a shoulder joint of the person.

In a similar embodiment, a remote-center joint for an arm supporting exoskeleton comprises a base segment coupled to a torso frame of the arm supporting exoskeleton, wherein the torso frame is configured to be coupled to the torso of a person, a terminal segment coupled to an arm segment of the arm supporting exoskeleton, wherein the arm segment is configured to be coupled to the arm of a person, a first segment and a third segment each rotatably coupled to the base segment about parallel axes, wherein the first segment and the third segment are geared together, a second segment and a fourth segment each rotatably coupled to the terminal segment about parallel axes, wherein the second segment and the fourth segment are geared together, wherein the second segment is rotatably coupled to the first segment and the third segment is rotatably coupled to the fourth segment such that the remote center joint rotates arm segment relative to the torso frame about an imaginary axis that does not pass through any mechanical joint.

DETAILED DESCRIPTION

Figure 1A:
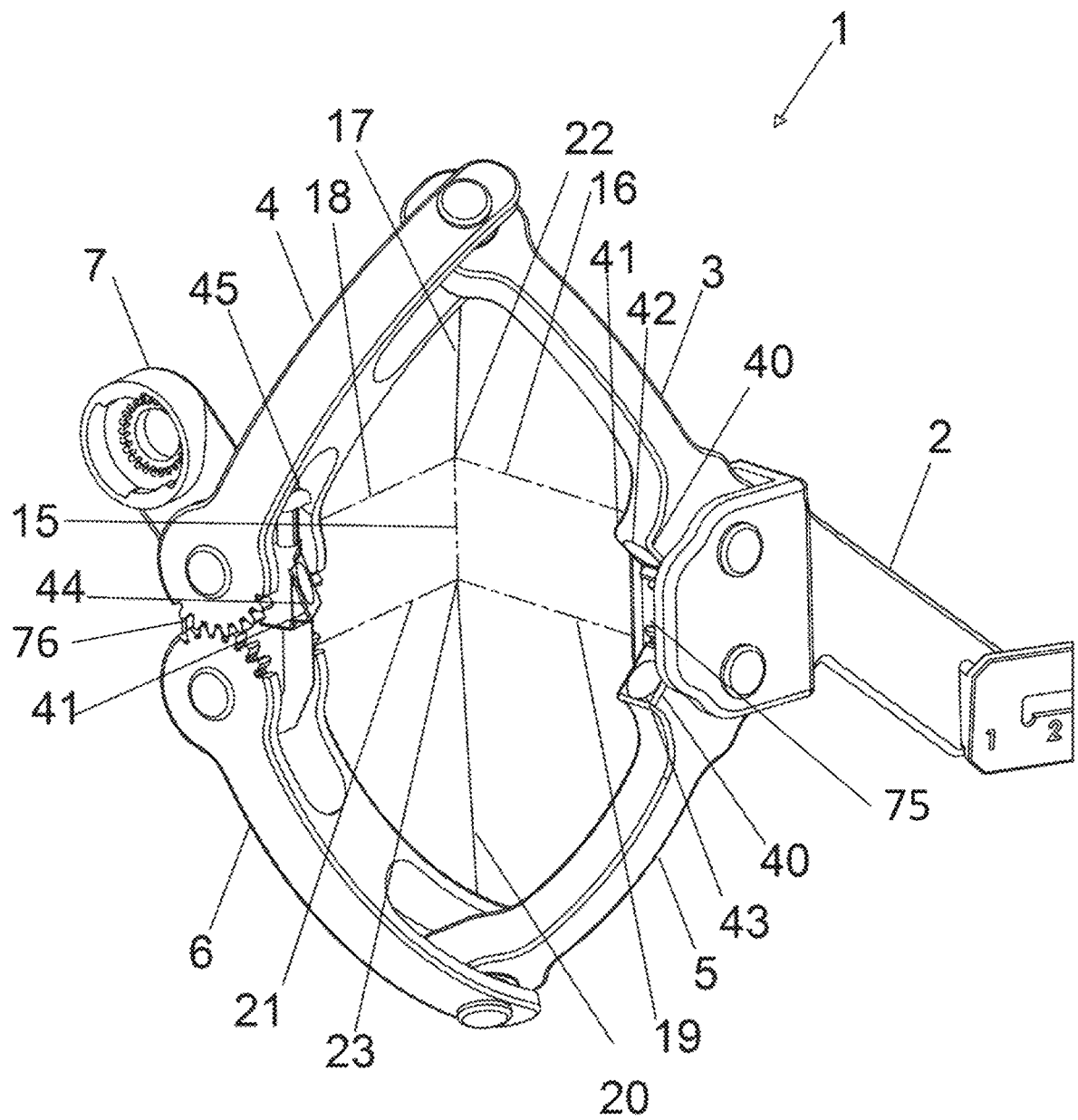
FIG. 1A shows a perspective view of the remote center joint.

FIG. 1A shows a perspective view of remote center joint 1 in a partially extended position. Remote center joint 1 is configured to rotate terminal segment 7 relative to base segment 2 along imaginary axis 15. Remote center joint 1 comprises first segment 3 rotatably coupled to base segment 2 along first axis 16. Second segment 4 is rotatably coupled to first segment 3 about second axis 17 which intersects first axis 16 at first point 22. Second segment 4 is rotatably coupled to terminal segment 7 about third axis 18 which intersects first point 22. Third segment 5 is rotatably coupled to base segment 2 about fourth axis 19 parallel to first axis 16. Fourth segment 6 is rotatably coupled to third segment 5 about fifth axis 20 which intersects fourth axis 19 at second point 23. Fourth segment 6 is rotatably coupled to terminal segment 7 along sixth axis 21 which intersects second point 23. Imaginary axis 15 of rotation of terminal segment 7 relative to base segment 2 is a line connecting first point 22 and second point 23. In some embodiments, third segment 5 is geared to first segment 3 with a first set of intermeshing gears 75, and fourth segment 6 is geared to second segment 4 with a second set of intermeshing gears 76. In a primary embodiment, at least a portion of a weight, force, or torque applied to terminal segment 7 is transferred by remote center joint 1 to base segment 2.

Figure 1B:
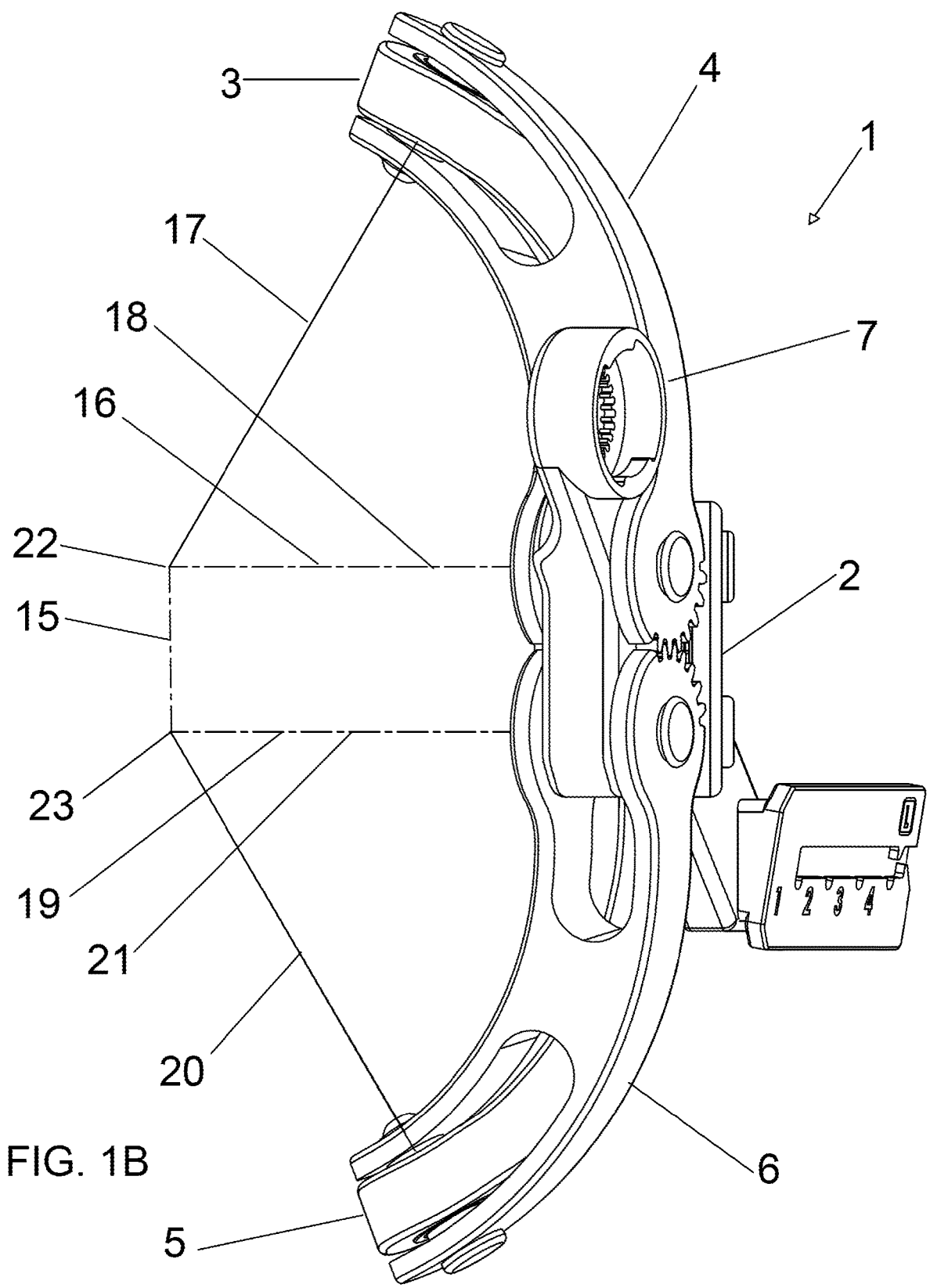
FIG. 1B shows a side view of the remote center joint in a partially extended position.

FIG. 1B shows a side view of remote center joint 1. It can be seen that imaginary axis 15 is substantially separated from the hardware profile and does not interest any segment of remote center joint. In other embodiments, imaginary axis 15 does not pass through any mechanical joint. This is in opposition to a real axis which is formed by two or more links and crosses through the hardware of those links, such as first axis 16 formed between base segment 2 and first segment 3. This allows for remote center joint 1 to be placed outside of an object while rotating along an axis that passes through that object. Additionally, remote center joint 1 creates imaginary axis 15 through only rotational joints, as opposed to creating an axis through a curved track and carriage. Rotational joints are simpler to add bearing surface to and seal, increasing the robustness of remote center joint. Additionally, the collapsed configuration of remote center joint as seen in FIG. 2 is much smaller than what would be possible with a curved track and carriage.

Figure 2:
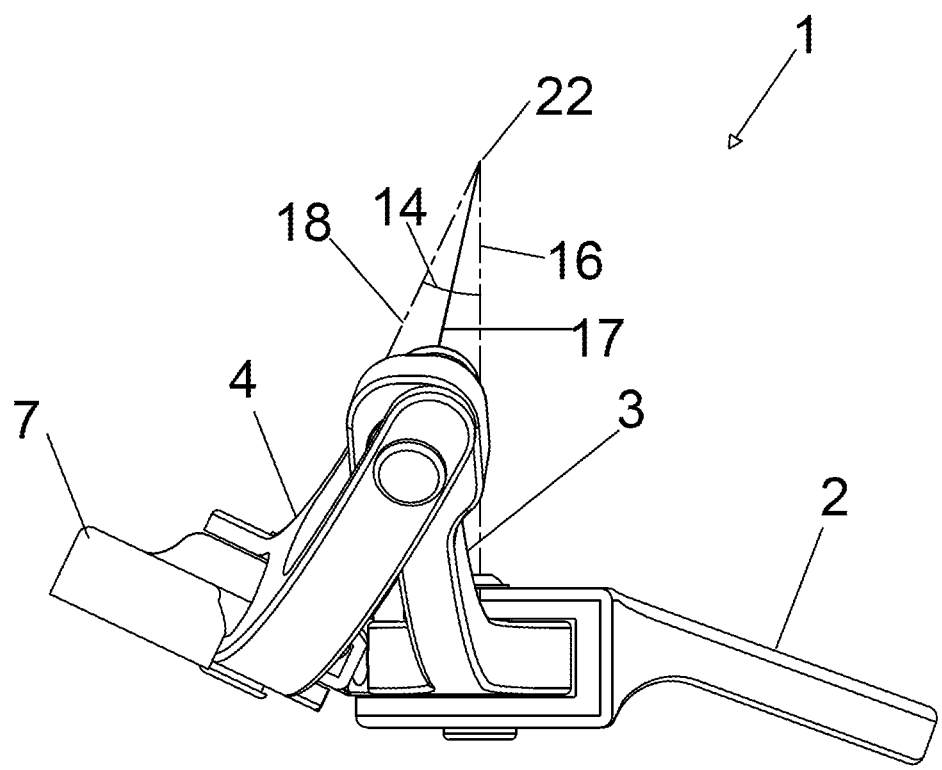
FIG. 2 shows a top view of the remote center joint in a flexed position.
Figure 3:
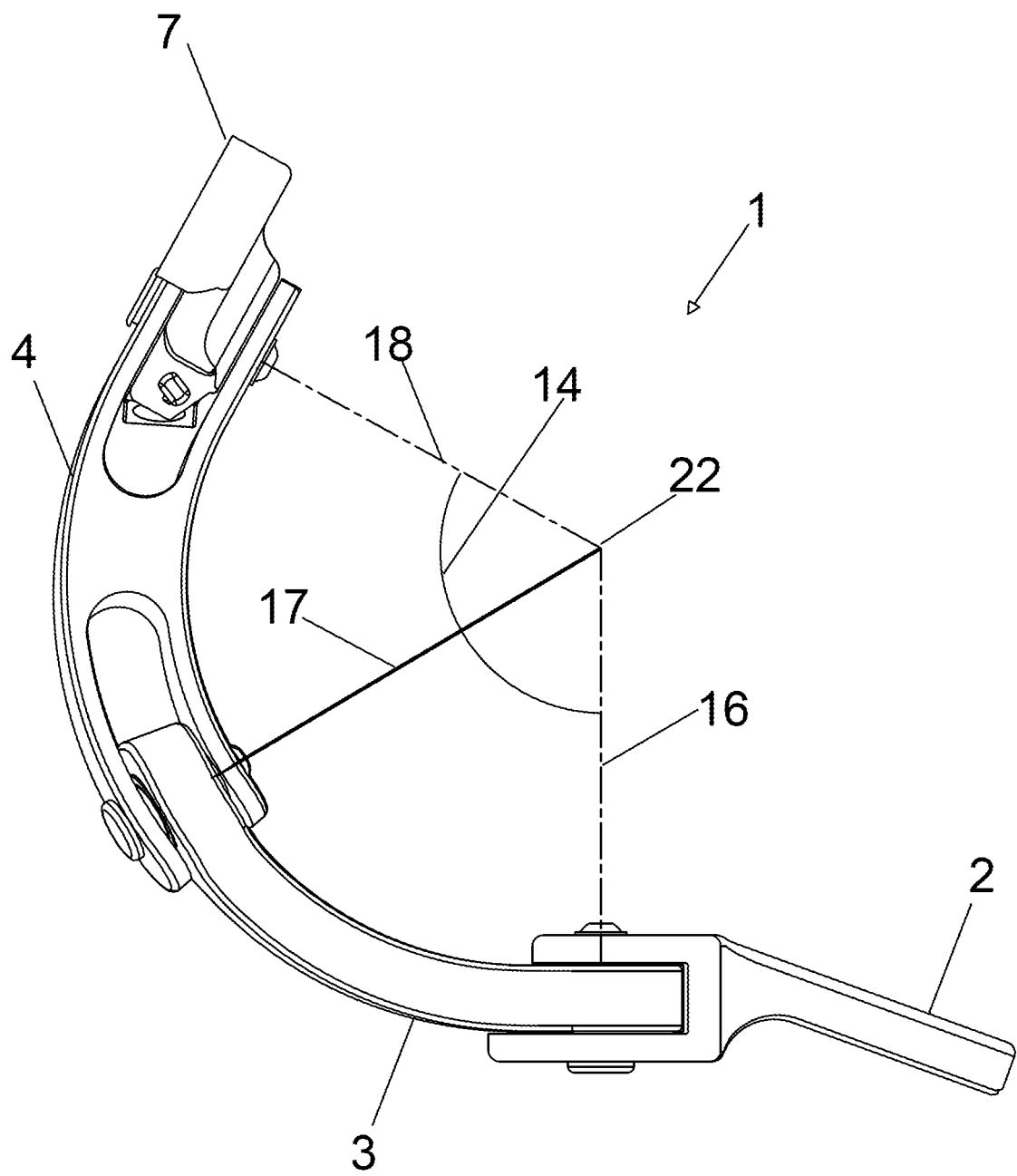
FIG. 3 shows a top view of the remote center joint in an extended position.

FIG. 2 and FIG. 3 show a top view of remote center joint 1. In this view, first point 22 is coincident with second point 23 and imaginary axis 15 is perpendicular to the page. In the view of FIG. 2 and FIG. 3, first axis 16 overlaps and hides fourth axis 19, second axis 17 overlaps and hides fifth axis 20, and third axis 18 overlaps and hides sixth axis 21. It can be seen that first point 22, and thus imaginary axis 15 is substantially separated from the hardware profile. This allows for remote center joint 1 to be placed to the side of an object while rotating along an axis that passes through that object.

In FIG. 2 remote center joint 1 is in a flexed position, forming a small joint rotation angle 14 between first axis 16 and third axis 18 about first point 22. Joint rotation angle 14 may similarly be defined as the angle between base segment 2 and terminal segment 7 about first point 22. A collapsing motion is defined as motion of terminal segment 7 relative to base segment 2 that results in a reduction of joint rotation angle 14. An extension motion is defined as motion of terminal segment 7 relative to base segment 2 that results in an increase of joint rotation angle 14.

In FIG. 3 remote center joint 1 is in an extend position, forming a large joint rotation angle 14 compared to FIG. 2. In FIG. 3 it can be seen how remote center joint 1 is capable of moving around an object while maintaining imaginary axis 15 passing through the object. It can be seen that terminal segment 7 rotates relative to base segment 2 through the intermediate segments and axes without terminal segment 7 being directly coupled to base segment 2. Rotation of terminal segment 7 about imaginary axis 15 is not generated by a single joint, but instead is generated by the collective six joints forming first axis 16, second axis 17, third axis 18, fourth axis 19, fifth axis 20, and sixth axis 21. It can also be appreciated by one skilled in the art that despite the number of segments and axes between terminal segment 7 and base segment 2, terminal segment 7 has only one degree of freedom and is thus not able to translate or rotate in directions other than about imaginary axis 15 due to forces that may be applied to any segment of remote center joint 1. This allows for controlled and predictable motion of terminal segment 7 relative to base segment 2.

Passive motion of remote center joint 1 may be achieved through forces applied to terminal segment 7 about imaginary axis 15 while base segment 2 remains fixed. Forces applied to terminal segment 7 not creating a movement about imaginary axis 15 will be transferred to base segment 2 without affecting motion of remote center joint 1. In some embodiments, forces from a rotary or linear actuator, either active or passive, may be applied between any two segments of remote center joint 1 to control motion between terminal segment 7 and base segment 2. The actuator may be mounted directly onto remote center joint 1, or forces from an externally mounted actuator may be transferred to remote center joint 1 through a cable or cable and pulley system.

Figure 4:
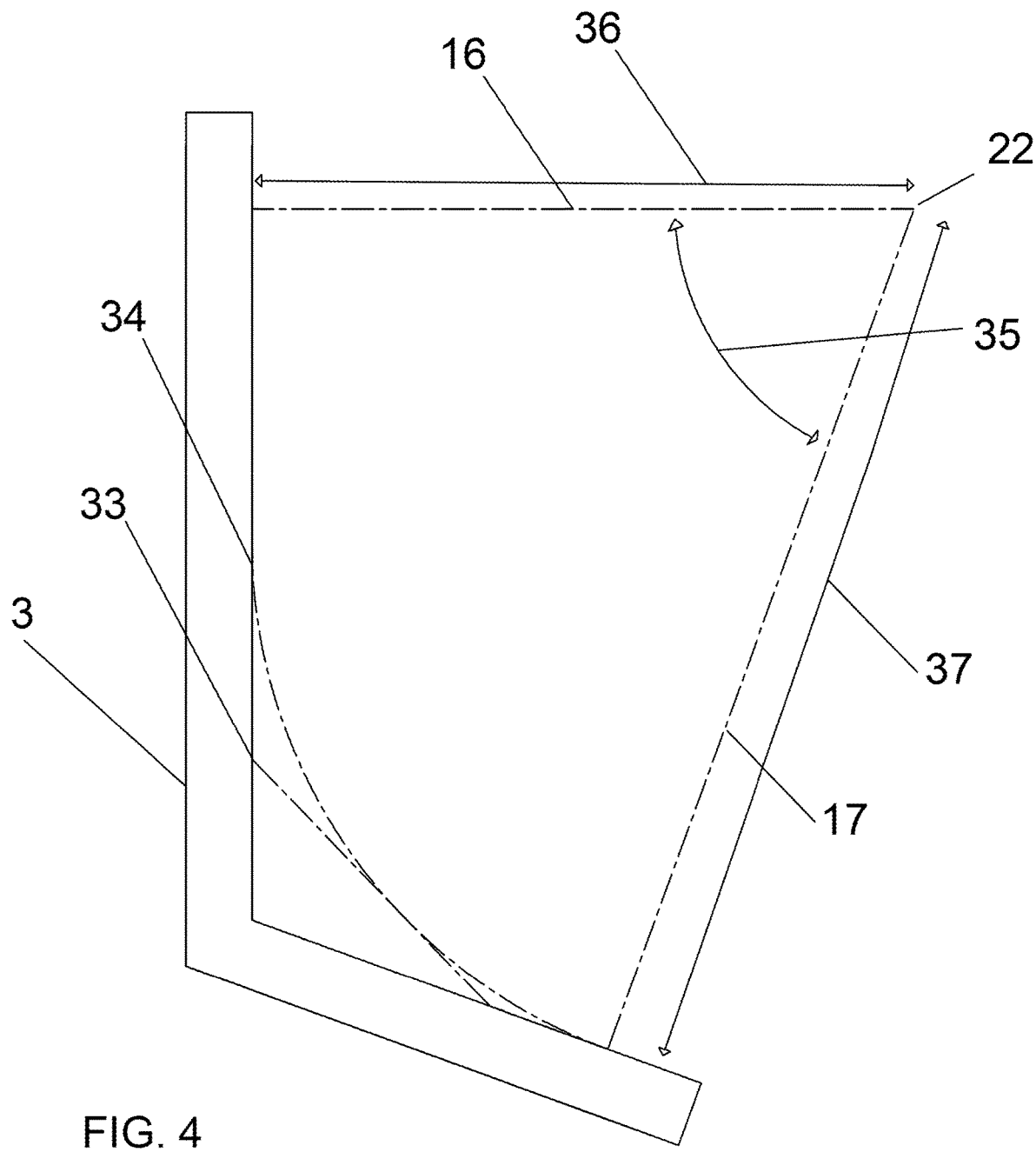
FIG. 4 shows a top view of a segment.

FIG. 4 shows a top view of first segment 3 with first axis 16 and second axis 17 converging at first point 22. Arc angle 35 is defined as the angle between first axis 16 and second axis 17. First distance 36 is the measure between first point 22 and first segment 3 along first axis 16. Second distance 37 is the measure between first point 22 and first segment 3 along second axis 17. In some embodiments as shown in FIG. 4 first distance 36 of first segment is different than second distance 37 of first segment. In other embodiments not shown, first distance 36 of first segment is the same as second distance 37 of first segment. First distance 36 and second distance 37 may be utilized to change the position of first point 22 or to alter the profile of remote center joint 1. It may be understood by one stilled in the art that first segment 3 may be of any shape to create first axis 16 and second axis 17. In FIG. 4 first segment 3 has a single bent profile, however first segment 3 may have a curved profile 34 as shown in FIG. 3 or a double bent profile 38 as show FIG. 9, among many others. Each segment may be of any shape as long as it comprises two intersecting axes of rotation when coupled to neighboring segments. One of skill in the art may also understand that the above description may similarly apply to second segment 4, third segment 5, or fourth segment 6. When applied to other segments, first distance 36 corresponds to the distance along first axis 16, third axis 18, fourth axis 19 or sixth axis 21 connecting to base segment 2 or terminal segment 7 as applicable. When applied to other segments, second distance 37 corresponds to the distance along second axis 17 or fifth axis 20 as applicable.

Figure 5:
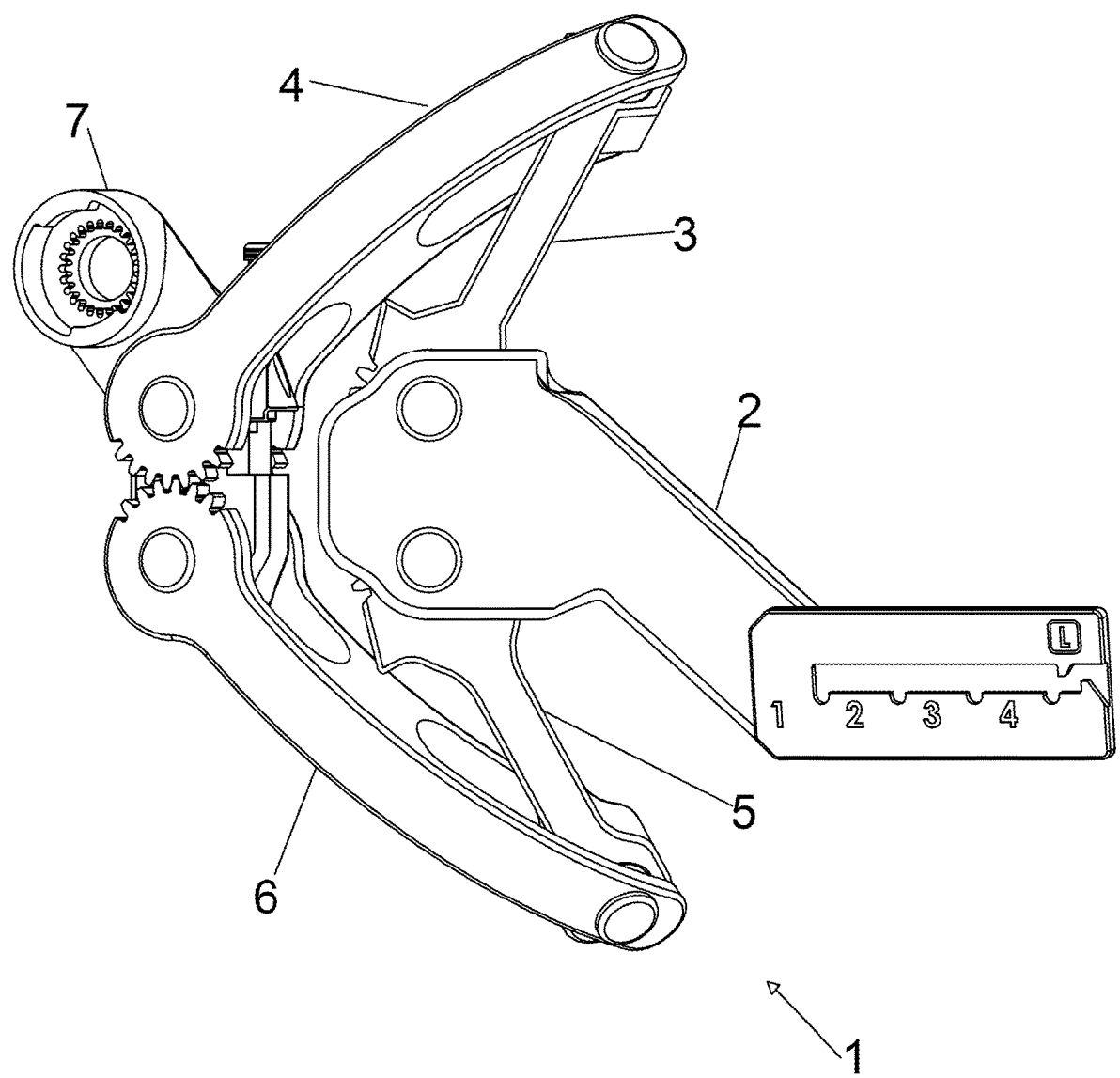
FIG. 5 shows a perspective view of an extended hard stop.

In some embodiments of remote center joint 1, arc angle 35 of first segment 3, second segment 4, third segment 5, and fourth segment 6 defines the range of motion of terminal segment 7 relative to base segment 2. In general, the range of motion of remote center joint 1 is the lesser of arc angle 35 of first segment 3 added to arc angle 35 of second segment 4 compared to arc angle 35 of third segment 5 added to arc angle 35 of fourth segment 6. In a preferred embodiment of remote center joint 1, arc angle 35 of first segment 3, second segment 4, third segment 5, and fourth segment 6 are equal. This allows the segments of remote center joint 1 to move symmetrically as shown in FIG. 1, FIG. 2, and FIG. 3. In other embodiments, arc angle 35 of first segment 3 is equal to arc angle 35 of third segment 5 and arc angle 35 of second segment 4 is equal to arc angle 35 of fourth segment 6 while the arc angle of first segment 3 is not equal to the arc angle of second segment 4. This causes symmetric motion between first segment 3 and third segment 5, and symmetric motion between second segment 4 and fourth segment 6, but asymmetric motion between first segment 3 and second segment 4 as shown in FIG. 5. In particular, the segments with (reduced) arc angle 35 will rotate about base segment 2 or terminal segment 7 to a greater degree than the segments with (increased) arc angle 35. This changes the profile of remote center joint 1 throughout the range of motion of terminal segment 7 relative to base segment 2. Still in other embodiments not shown, arc angle 35 of first segment 3 is equal to arc angle 35 of second segment 4 and arc angle 35 of third segment 5 is equal to arc angle 35 of fourth segment 6 while the arc angle 35 of first segment 3 is not equal to the arc angle 35 of third segment 5. This creates a similar asymmetry as seen in FIG. 5 but between the first segment 3 and second segment 4 compared to the third segment 5 and fourth segment 6. In some embodiments the arc angle 35 is different between each of the first segment 3, second segment 4, third segment 5, and fourth segment 6 creating asymmetry of motion between each segment. One of skill in the art may understand that changing the arc angle 35 of various segments may be used to alter the profile, strength, or aesthetic look of remote center joint 1.

In some embodiments of remote center joint 1, first distance 36 and second distance 37 of first segment 3, second segment 4, third segment 5, and fourth segment 6 defines the distance of imaginary axis 15 from the hardware, the orientation of imaginary axis 15, and the profile of remote center joint 1.

In a preferred embodiments of remote center joint 1, first distance 36 and second distance 37 of first segment 3 is equal to first distance 36 and second distance 37 of third segment 5 and first distance 36 and second distance 37 of second segment 4 is equal to first distance 36 and second distance 37 of fourth segment 6. This creates symmetric motion between first segment 3 and third segment 5 and creates imaginary axis 15 that is perpendicular to first axis 16, third axis 18, fourth axis 19, and sixth axis 21 as shown in FIG. 1.

In another embodiment of remote center joint 1, first distance 36 of first segment 3 is different than first distance 36 of third segment 5 and first distance 36 of second segment 4 is different than first distance 36 of fourth segment 6. This effect, not shown, tilts imaginary axis 15 such that it is not perpendicular to first axis 16, third axis 18, fourth axis 19, and sixth axis 21. In another embodiment of remote center joint 1, second distance 37 of first segment 3 is different than second distance 37 of third segment 5 and second distance 37 of second segment 4 is different than second distance 37 of fourth segment 6. This effect, not shown, creates an asymmetry in profile between the first segment 3 and second segment 4 compared to the third segment 5 and fourth segment 6.

In some embodiments, first distance 36 and second distance 37 of first segment 3 is the same as first distance 36 and second distance 37 of second segment 4, and first distance 36 and second distance 37 of third segment 5 is the same as first distance 36 and second distance 37 of fourth segment 6. This configuration is shown in FIG. 1, FIG. 2 and FIG. 3 such that first segment 3 and second segment 4 may be joined by a double supported clevis joint. In addition, terminal segment 7 will contact base segment 2 in a fully flexed position as the segments are not configured to overlap.

Figure 16:
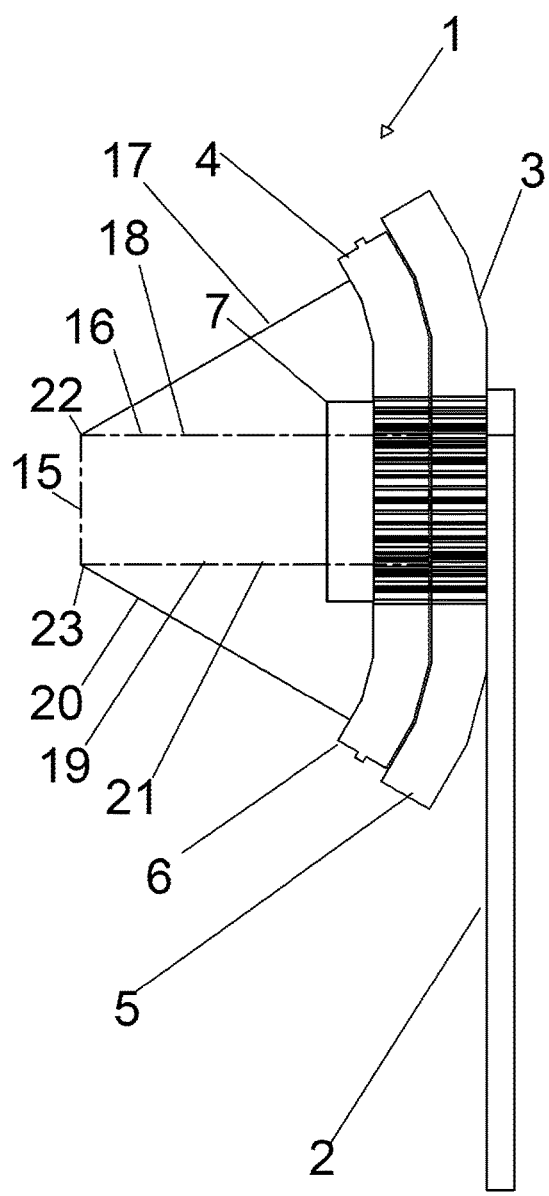
FIG. 16 shows a remote center joint in a single supported overlapping configuration configured to provide bidirectional torso twisting in a flexed position.
Figure 16:
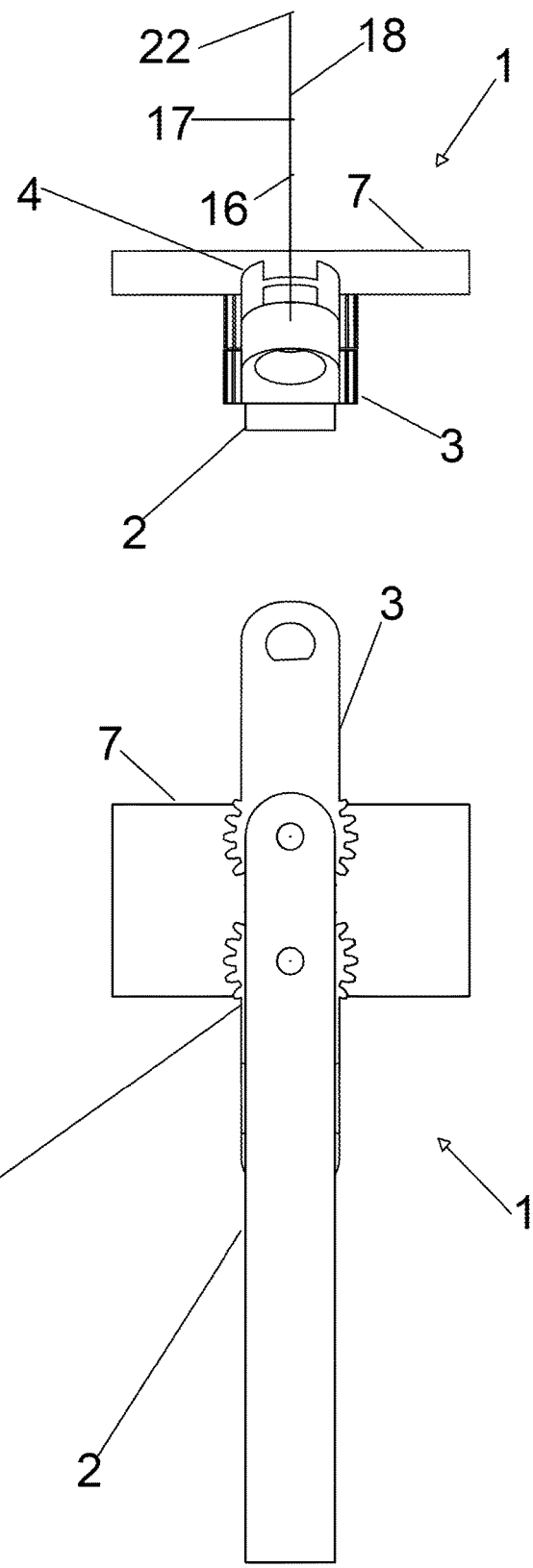
Figure 17:
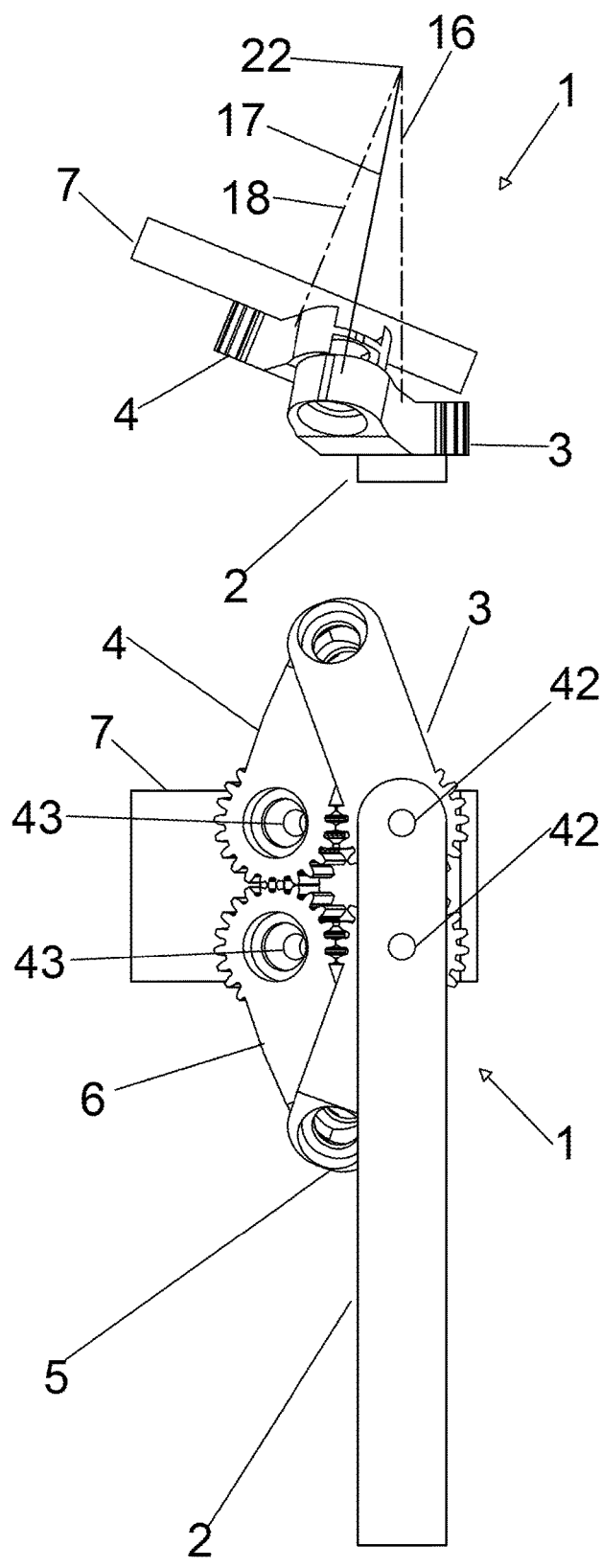
FIG. 17 shows a remote center joint in a single supported overlapping configuration configured to provide bidirectional torso twisting in a partially extended position.
Figure 17:
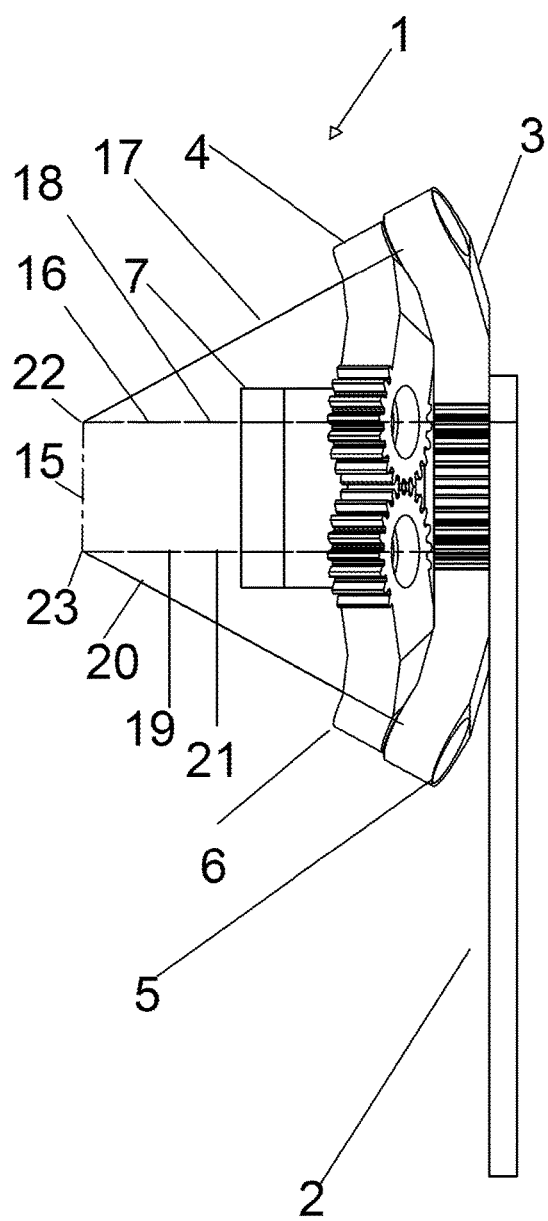

In another embodiment, first distance 36 and second distance 37 of first segment 3 is different than first distance 36 and second distance 37 of second segment 4, and first distance 36 and second distance 37 of third segment 5 is different than first distance 36 and second distance 37 of fourth segment 6. This configuration is shown in FIG. 16 and FIG. 17 such that first segment 3 and second segment 4 may overlap each other. As a result, terminal segment 7 will not contact base segment 2 in a fully flexed position to increase the range of motion of remote center joint 1 so that it may move bi-directionally. Altering the first distance 36 of any segment will affect how far base segment 2 overlaps terminal segment 7 at the fully flexed position, and altering the second distance 37 of any segment will affect the overlap between segments, specifically the overlap between first segment 3 and second segment 4 along second axis 17, or the overlap between third segment 5 and fourth segment 6 along fifth axis 20. Each segment may have varying the first distance 36 or second distance 37 depending on the mechanical connection in order to align their respective axes to first point 22 or second point 23.

In some embodiments, first distance 36 and second distance 37 of the first segment 3, second segment 4, third segment 5, and fourth segment 6 are defined such that imaginary axis 15 is perpendicular to the first axis 16.

In some embodiments the gearing between first segment 3 and third segment 5 is a 1:1 ratio. In other embodiments the gearing between second segment 4 and fourth segment 6 is a 1:1 ratio. In the primary embodiment the gearing between segments occurs through gear teeth integrated into each segment. In other embodiments, separate gears may be attached to each segment to accomplish controlled geared motion between segments. Still in other embodiments, a high friction coating may be sufficient to gear two segments together.

In some embodiments, two segments of remote center joint 1 may be configured to hard stop against each other to limit the range of motion of terminal segment 7 relative to base segment 2. Hard stopping motion of remote center joint 1 at an extended position may be utilized to limit the range of motion of remote center joint 1, or to prevent remote center joint 1 from entering a position after which it becomes difficult to re-collapse the joint. Similarly, hard stopping motion of remote center joint 1 at a flexed position may be utilized to limit the range of motion. Remote center joint 1 may further comprise a hard stop spring, such as a spring plunger, coupled to any of the segments and configured to selectively contact another segment in order to bias remote center joint 1 away from the hard stop position.

Figure 6:
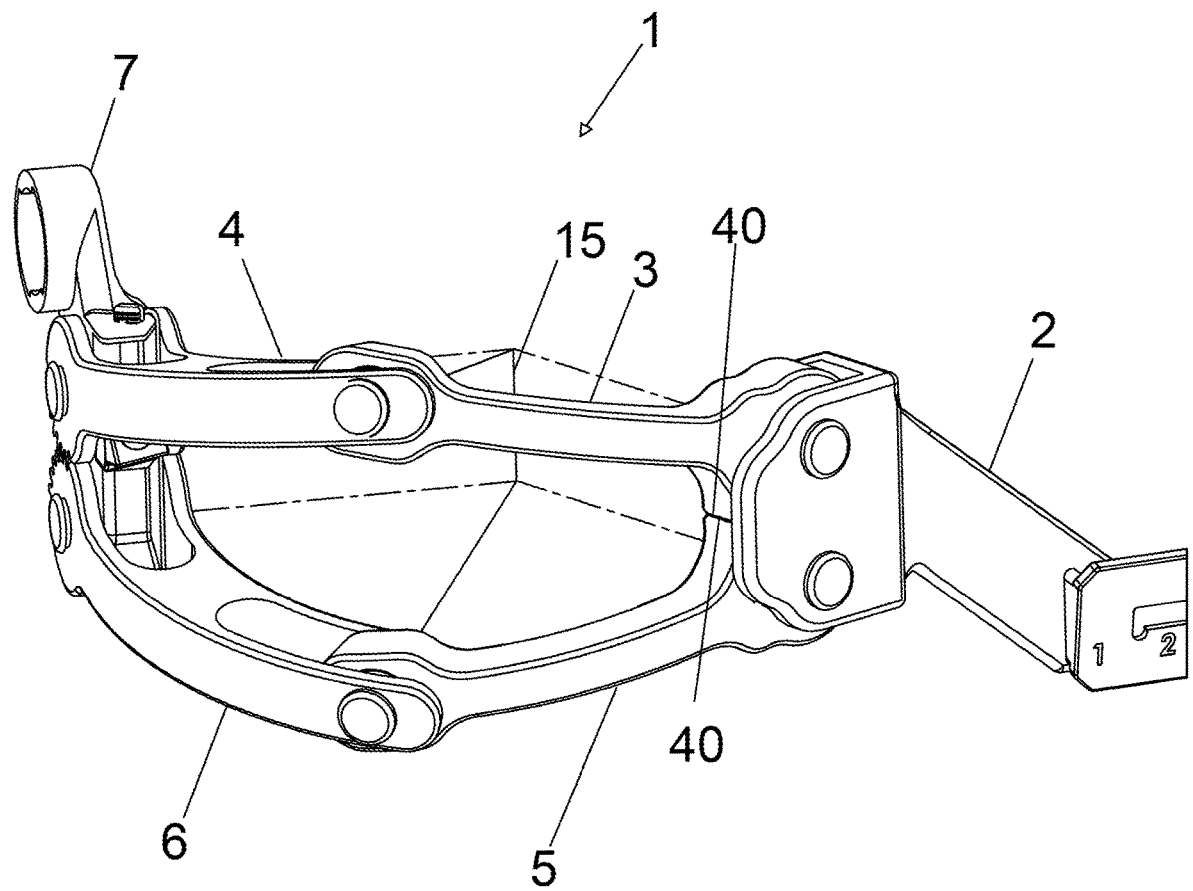
FIG. 6 shows a perspective view of a collapsed hard stop with stow engaged.

FIG. 6 shows a perspective view of remote center joint 1 in a fully extended position where at least one extension hard stop 40 limits further extension motion. In this embodiment, as also shown in FIG. 1 in a more flexed position, both first segment 3 and third segment 5 include extension hard stop 40. When extension hard stop 40 of first segment 3 contacts extension hard stop 40 of third segment 5, both first segment 3 and third segment 5 are prevented from further rotation about first axis 16 and fourth axis 19 respectively, thus preventing further extension motion of terminal segment 7 relative to base segment 2. It may be understood by one skilled in the art that hard stops may be placed between any set of two segments to prevent rotation corresponding to collapsing or extending motion of terminal segment 7 relative to base segment 2. In some embodiments one of the segments comprises first extension hard stop 40 and another of the segments comprises second extension hard stop 40, wherein at a fully extended position, first extension hard stop 40 and second extension hard stop 40 contact each other to prevent remote center joint 1 from increasing joint rotation angle 14.

In a preferred embodiment, remote center joint 1 further comprises first magnet 42 coupled to first extension hard stop 40 and second magnet 43 coupled to second extension hard stop 40, wherein first magnet 42 and second magnet 43 are configured to repel first extension hard stop 40 from second extension hard stop 40. In another embodiment, remote center joint 1 further comprises first magnet 42 coupled to first extension hard stop 40 and second magnet 43 coupled to second extension hard stop 40, wherein first magnet 42 and second magnet 43 are configured to attract first extension hard stop 40 to second extension hard stop 40. In some embodiments, remote center joint 1 further comprises first magnet 42 coupled to any of the segments, and second magnet 43 coupled to any other segment, wherein first magnet 42 and second magnet 43 are configured to bias remote center joint away from an extended hard stop position. In other embodiments, first magnet 42 and second magnet 43 are configured to bias remote center joint 1 into an extended hard stop position. In the embodiment of FIG. 1 and FIG. 6, first magnet 42 is coupled to first segment 3, and second magnet 43 is coupled to third segment 5. First magnet 42 and second magnet 43 are configured to repel each other to bias the rotation of first segment 3 and third segment 5 in a direction that corresponds to a reduction in joint rotation angle 14 of terminal segment 7 relative to base segment 2. In this configuration the force between first magnet 42 and second magnet 43 is greatest at the fully extended position and reduces as remote center joint 1 moves away from this position. One of skill in the art may recognize that a similar result could be obtained through a spring, such as a spring plunger, coupled to first segment 3 or third segment 5 in a similar location. An opposite result may be achieved by reversing the polarity of either first magnet 42 or second magnet 43 so that they attract each other, resulting in a bias of remote center joint 1 towards the fully extended position. One of skill in the art may also recognize that an equivalent function may be achieved between any two segments of remote center joint 1, with the polarity of first magnet 42 and second magnet 43 impacting whether remote center joint 1 is biased towards or repelled from any position of terminal segment 7 relative to base segment 2, most notably for the fully extended and fully flexed positions.

Figure 7:
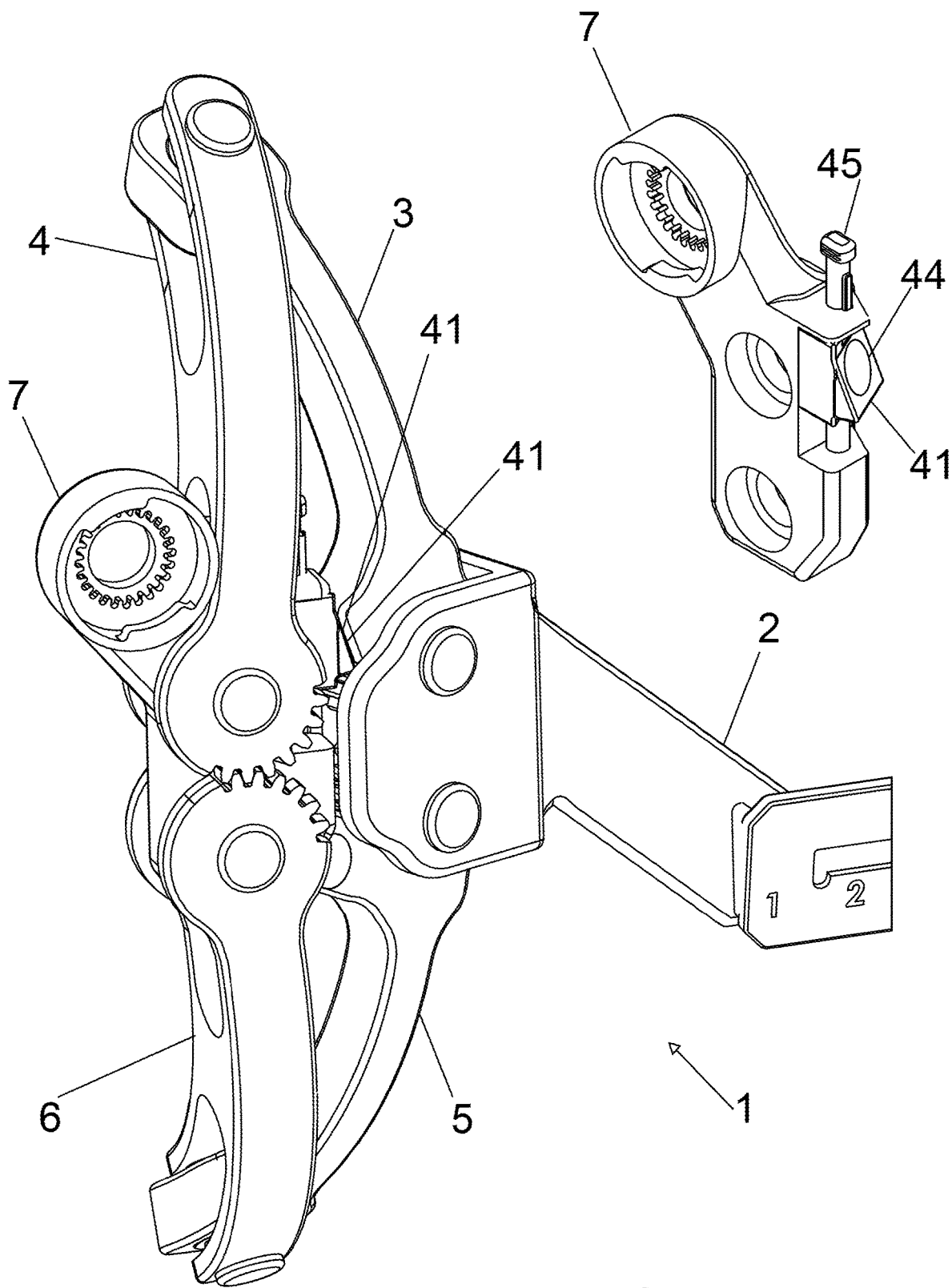
FIG. 7 shows a perspective view of a collapsed hard stop with stow disengaged.
Figure 8:
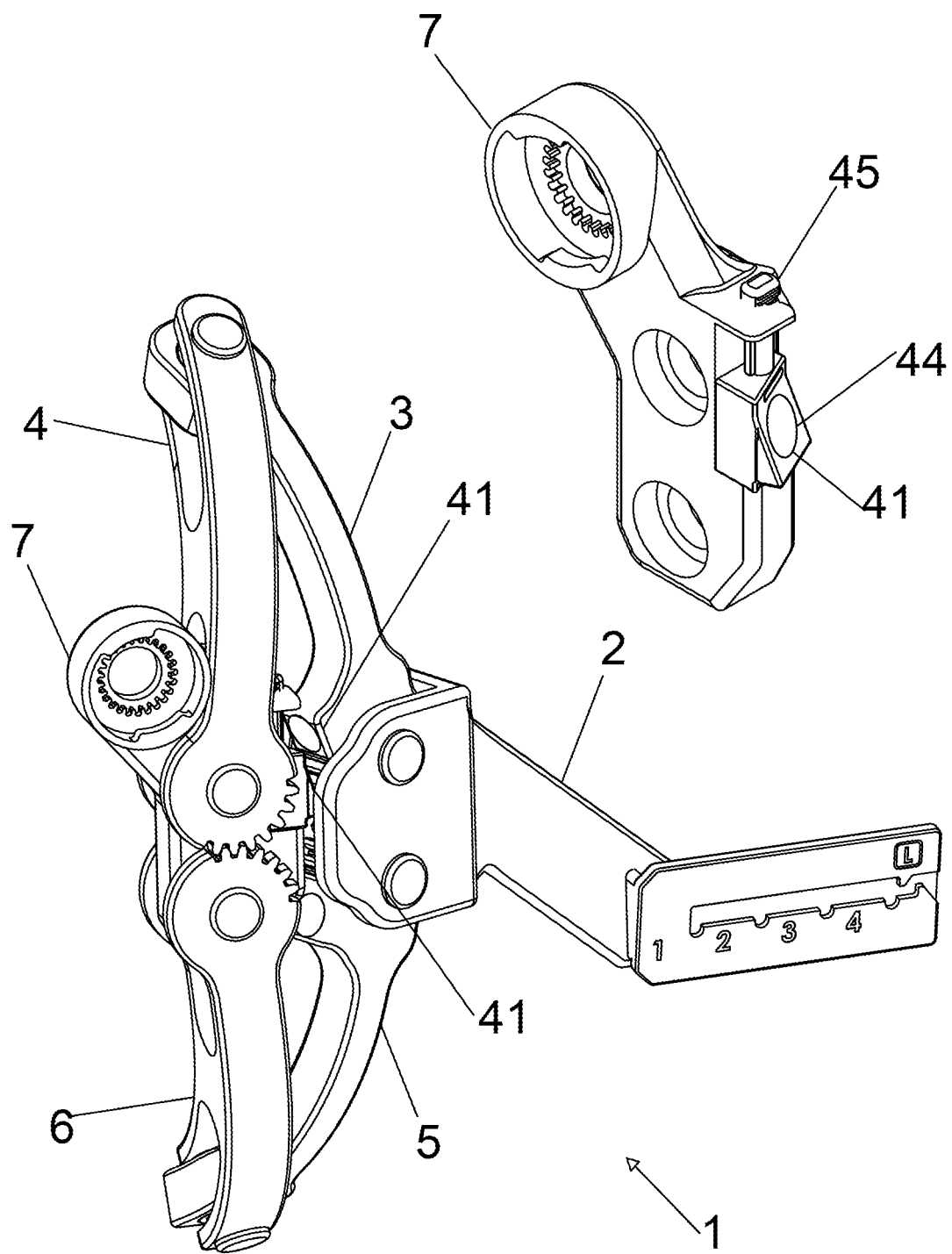
FIG. 8 shows angled segments arranged in a double supported nesting design in a flexed position.

FIG. 7 shows remote center joint 1 in a fully flexed position where at least one flexion hard stop 41 prevents further collapsing motion. In this embodiment, as also shown in FIG. 1 in a more extended position, both first segment 3 and terminal segment 7 include the at least one flexion hard stop 41. When the at least one flexion hard stop 41 of first segment 3 contacts the at least one flexion hard stop 41 of terminal segment 7, first segment 3 is prevented from further rotation about first axis 16, thus preventing further collapsing motion of terminal segment 7 relative to base segment 2. It may be understood by one skilled in the art that hard stops may be placed between any set of two segments to prevent rotation corresponding to collapsing or extending motion of terminal segment 7 relative to base segment 2. In some embodiments one of the segments comprises a first flexion hard stop 41 and another of the segments comprises a second flexion hard stop 41, wherein at a fully flexed position, the first flexion hard stop 41 and the second flexion hard stop 41 contact each other to prevent remote center joint 1 from decreasing joint rotation angle 14.

In a preferred embodiment, remote center joint 1 further comprises first magnet 42 coupled to first flexion hard stop 41 and stow magnet 44 coupled to second flexion hard stop 41, wherein first magnet 42 and stow magnet 44 are configured to attract first flexion hard stop 41 to second flexion hard stop 41. In some embodiments, remote center joint 1 further comprises first magnet 42 coupled to any of the segments, and stow magnet 44 coupled to any other segment, wherein first magnet 42 and stow magnet 44 are configured to bias remote center joint 1 into a collapsed hard stop position. Holding remote center joint 1 in a flexed position may be utilized to store the mechanism in a low-profile manner when not in use. In some embodiments, first magnet 42 is configured to attract stow magnet 44 in order to bias and hold remote center joint 1 in a flexed position. In some embodiments, remote center joint 1 may further comprise stow switch 45 configured to move stow magnet 44 between a first position and a second position. When stow magnet 44 is in the first position it comes into contact with first magnet 42 when remote center joint 1 is in a fully flexed position, thus applying a force to hold remote center joint 1 in a fully flexed position. When stow magnet 44 is in the second position it does not come into contact with first magnet 42 when remote center joint 1 is in a fully flexed position and does not apply a force to hold remote center joint 1 against flexion hard stop 41. In the primary embodiment, first magnet 42 is coupled to first segment 3 and stow magnet 44 is moveably coupled to terminal segment 7. It may be understood by one skilled in the art that the first magnet 42 and stow magnet 44 may be placed between any two segments to accomplish the same function as described above.

In some embodiments, remote center joint 1 further comprises a stow mechanism configured to hold remote center joint 1 in a collapsed configuration when not in use. Many types of mechanism may be used between any two segments to hold remote center joint 1 in place. Examples include hook and latch, male/female connectors, or an over the center toggle mechanism, among others.

In some embodiments, remote center joint 1 further comprises a spring 82 configured to act between at least two segments to bias the motion of terminal segment 7 relative to base segment 2. Spring 82 may be selected from a list including torsion spring, compression spring, gas spring, leaf spring, elastic band, or other common resilient element known to those skilled in the art. In some embodiments, spring 82 is configured to bias the motion of terminal segment 7 relative to base segment 2 throughout the range of motion of remote center joint 1. Spring 82 may be configured to bias remote center joint 1 in an extending or collapsing direction. When spring 82 is configured to bias remote center joint 1 in a collapsing direction it may fulfill a function similar to the stow mechanism described above. In some embodiments, spring 82 is configured to bias terminal segment 7 in a collapsing direction relative to base segment 2 only at the extreme extended range of motion of remote center joint 1. In other embodiments, spring 82 is configured to bias terminal segment 7 in an extending direction relative to base segment 2 only at the extreme collapsed range of motion of remote center joint 1.

Figure 9:
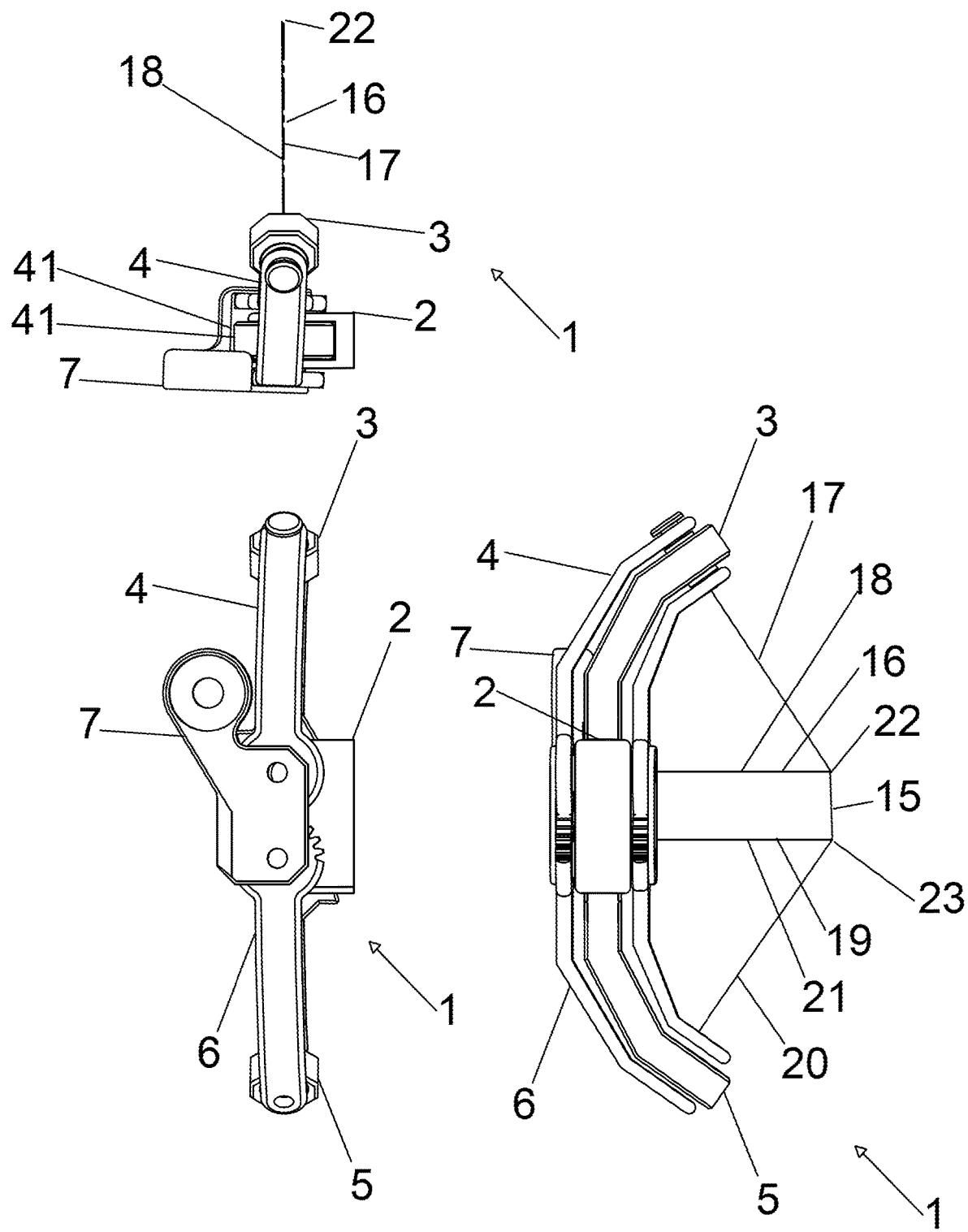
FIG. 9 shows angled segments arranged in a double supported nesting design in an extended position.

It may be understood by one skilled in the art that each segment may be composed of one or more links. In some embodiments, as shown in FIG. 1 each segment comprises a single link arranged so that each joint is double supported. In other embodiments, as shown in FIG. 9, some segments may comprise two links arranged in parallel so that each joint is double supported. Still in other embodiments, as shown in FIG. 16, each segment may comprise a single link arranged so that each joint is single supported. Each arrangement may be utilized for one or more segments to optimize remote center joint 1 for strength, range of motion, profile, or other common characteristics.

Figure 10:
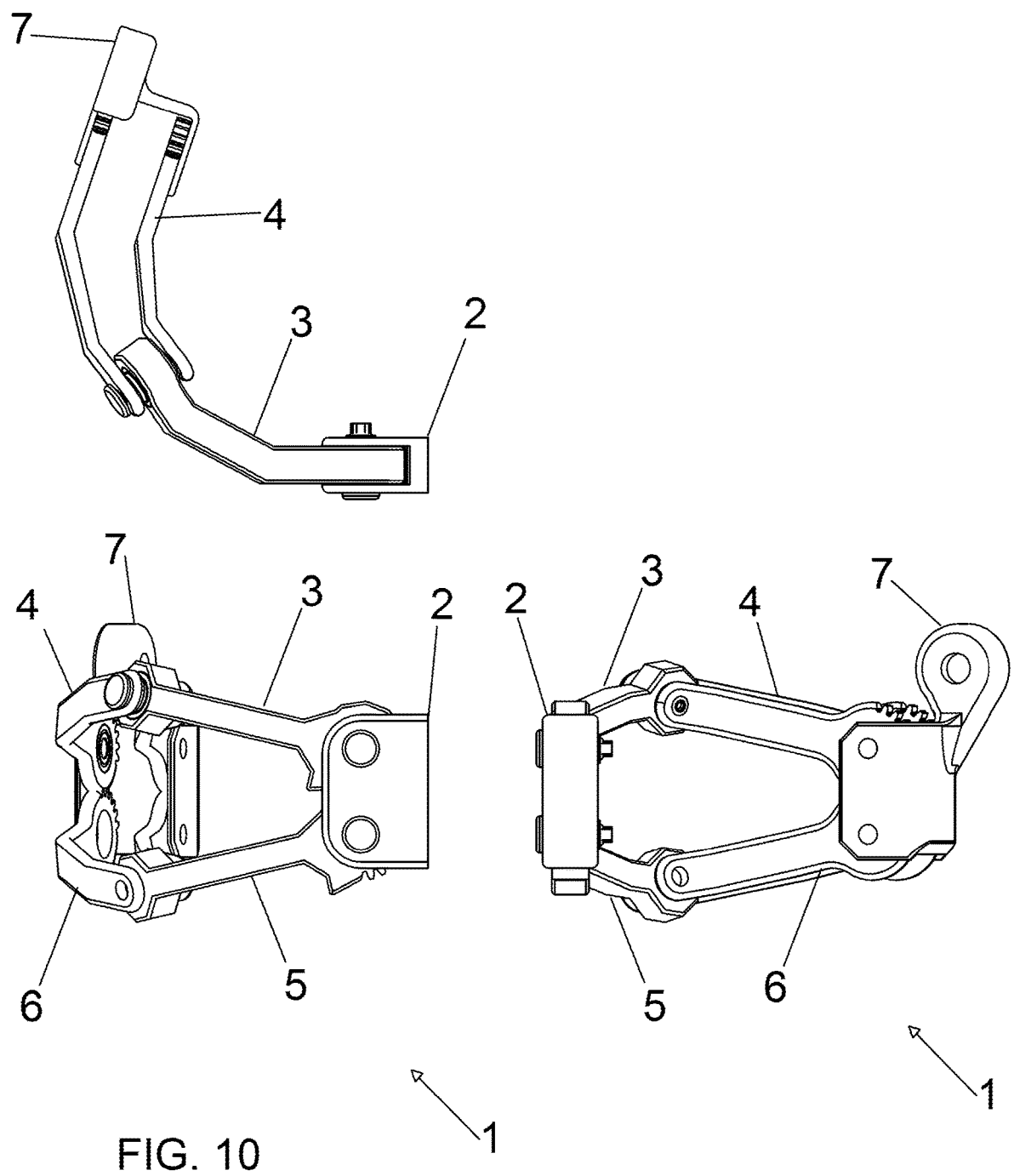
FIG. 10 shows an arrangement with two remote center joints arranged in series.

FIG. 9 and FIG. 10 show an embodiment of remote center joint 1 wherein the segments are configured so that in the fully collapsed configuration first axis 16 and third axis 18 become approximately coincident. This allows remote center joint 1 to maximize its range of motion and minimize its profile when stowed. In the embodiment of FIG. 9 and FIG. 10 first segment 3 and third segment 5 are comprised of single linkages, while second segment 4 and fourth segment 6 are comprised of at least two linkages that overlap first segment 3 and third segment 5 while each joint remains double supported. FIG. 9 shows remote center joint 1 in a fully flexed position and FIG. 10 shows remote center joint 1 in an extended position.

Figure 11:
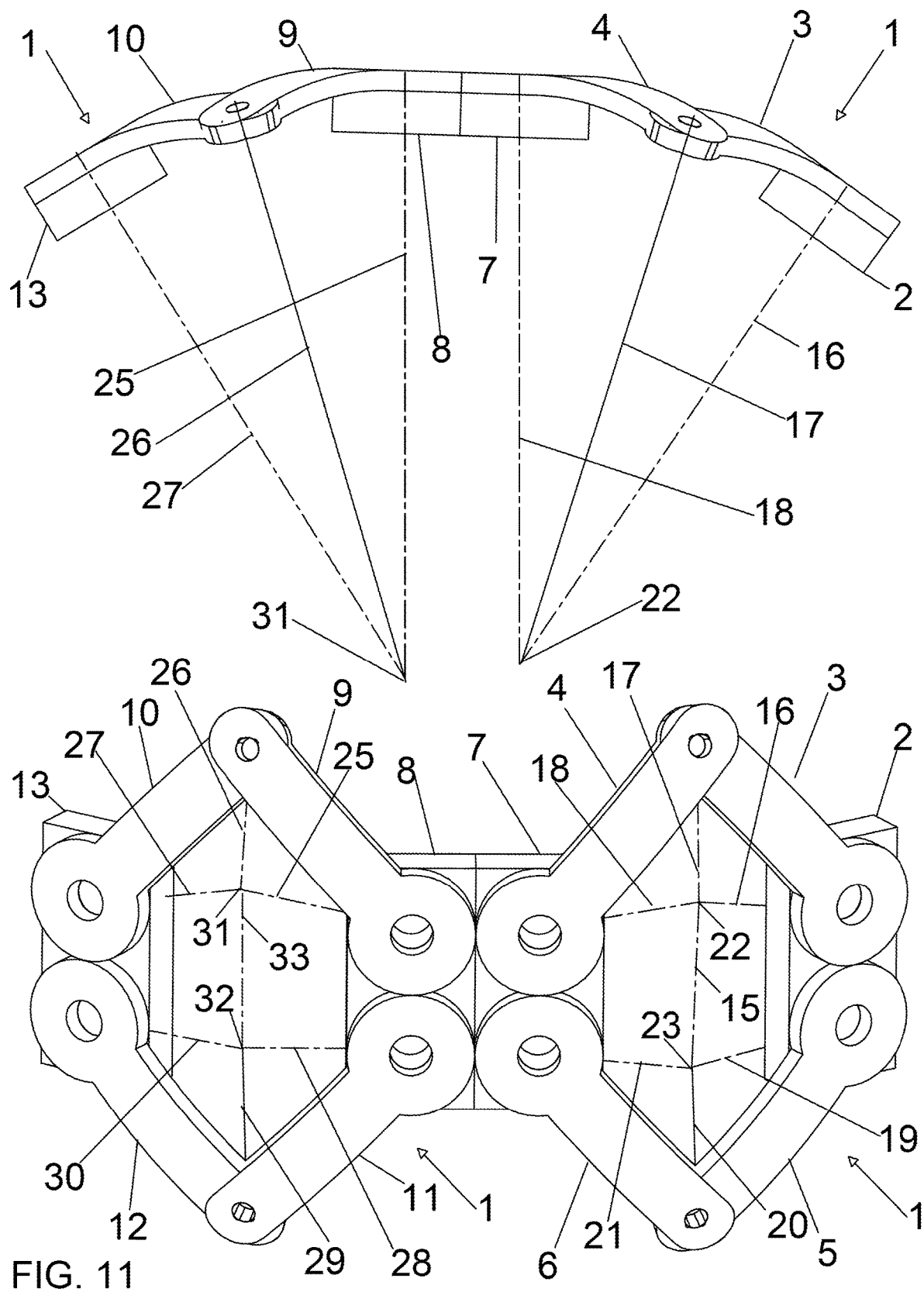
FIG. 11 shows an arrangement were segments 2 and 4 are of different dimension than segments 1 and 3 in a flexed position.

FIG. 11 shows an embodiment where two of remote center joint 1 are connected in series in order to maximize the range of motion of a second terminal segment 13 relative to base segment 2 or to minimize profile of the mechanism. In this embodiment, remote center joint 1 further comprises second base segment 8, fifth segment 9, sixth segment 10, seventh segment 11, eighth segment 12, and second terminal segment 13. Second base segment 8 is coupled to terminal segment 7. Fifth segment 9 is rotatably coupled to second base segment 8 about seventh axis 25. Sixth segment 10 is rotatably coupled to fifth segment 9 about eighth axis 26 that intersects seventh axis 25 at third point 31. Second terminal segment 13 is rotatably coupled to sixth segment 10 about ninth axis 27 that intersects third point 31. Seventh segment 11 is rotatably coupled to second base segment 8 along tenth axis 28 that is parallel to seventh axis 25 and seventh segment 11 is geared to fifth segment 9. Eighth segment 12 is rotatably coupled to seventh segment 11 along eleventh axis 29 that intersects tenth axis 28 at fourth point 32. Eighth segment 12 is rotatably coupled to second terminal segment 13 along twelfth axis 30 that intersects fourth point 32 and eighth segment 12 is geared to sixth segment 10. Second terminal segment 13 is configured to rotate relative to second base segment 8 about second imaginary axis 33 passing between third point 31 and fourth point 32. In some embodiments, second segment 4 is geared to fifth segment 9 in a 1:1 ratio to create symmetrical motion between the first remote center joint 1 and the second remote center joint 1. In some embodiments, fourth segment 6 is geared to seventh segment 11 to create symmetrical motion between first remote center joint 1 and second remote center joint 1. One of skill in the art may understand that any number of remote center joint 1 may be connected in series in a similar manner to accomplish a given range of motion, loading, profile, or other mechanical requirement. In some embodiments the linkages of the various remote center joint 1 connected in series may have varying radius, arc angle, or flat sections to vary the location of the multiple imaginary axes or the relative motion of the various segments.

Figure 12:
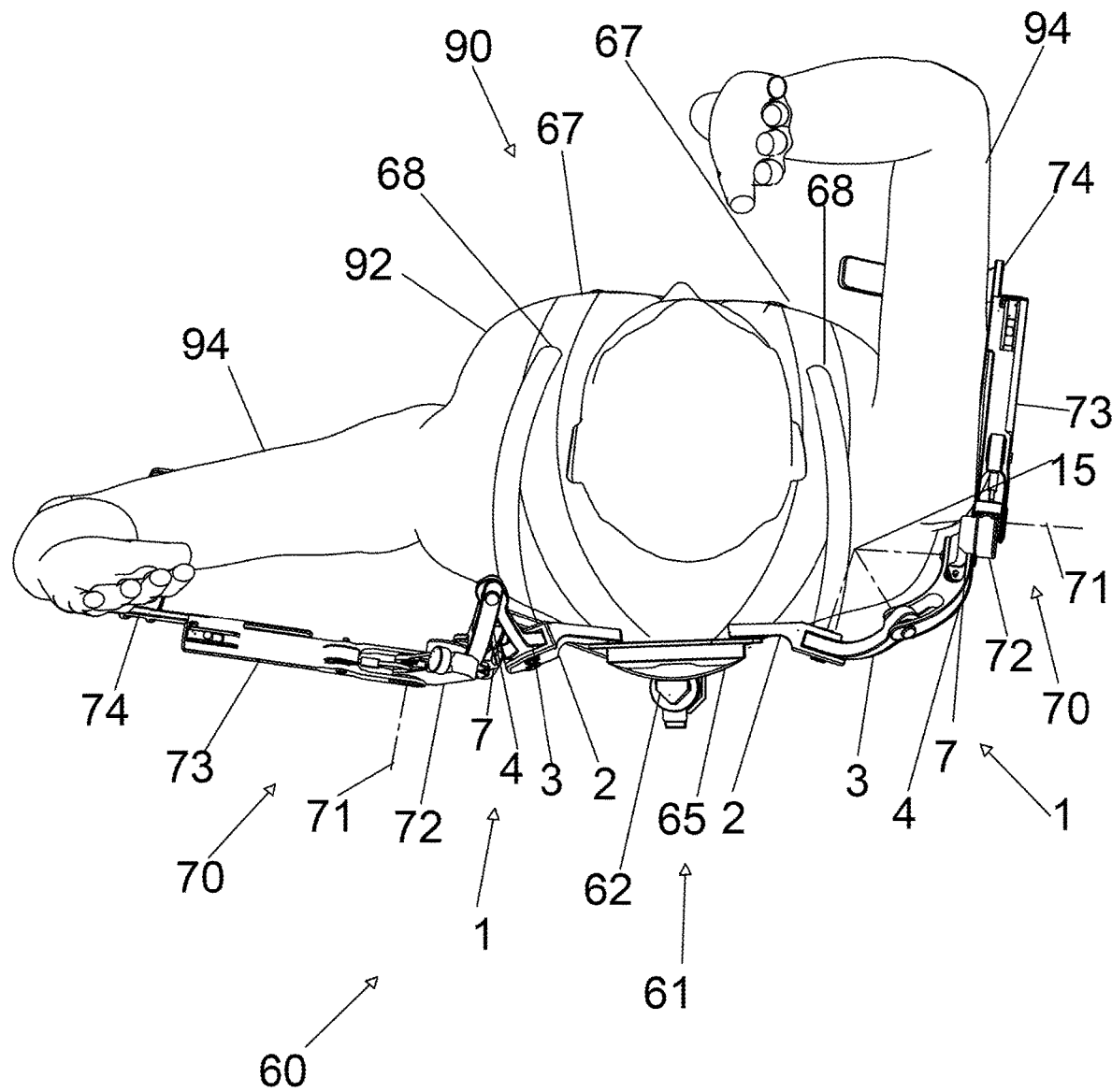
FIG. 12 shows a rear view of the remote center joint providing a degree of freedom for a shoulder supporting exoskeleton.
Figure 13:
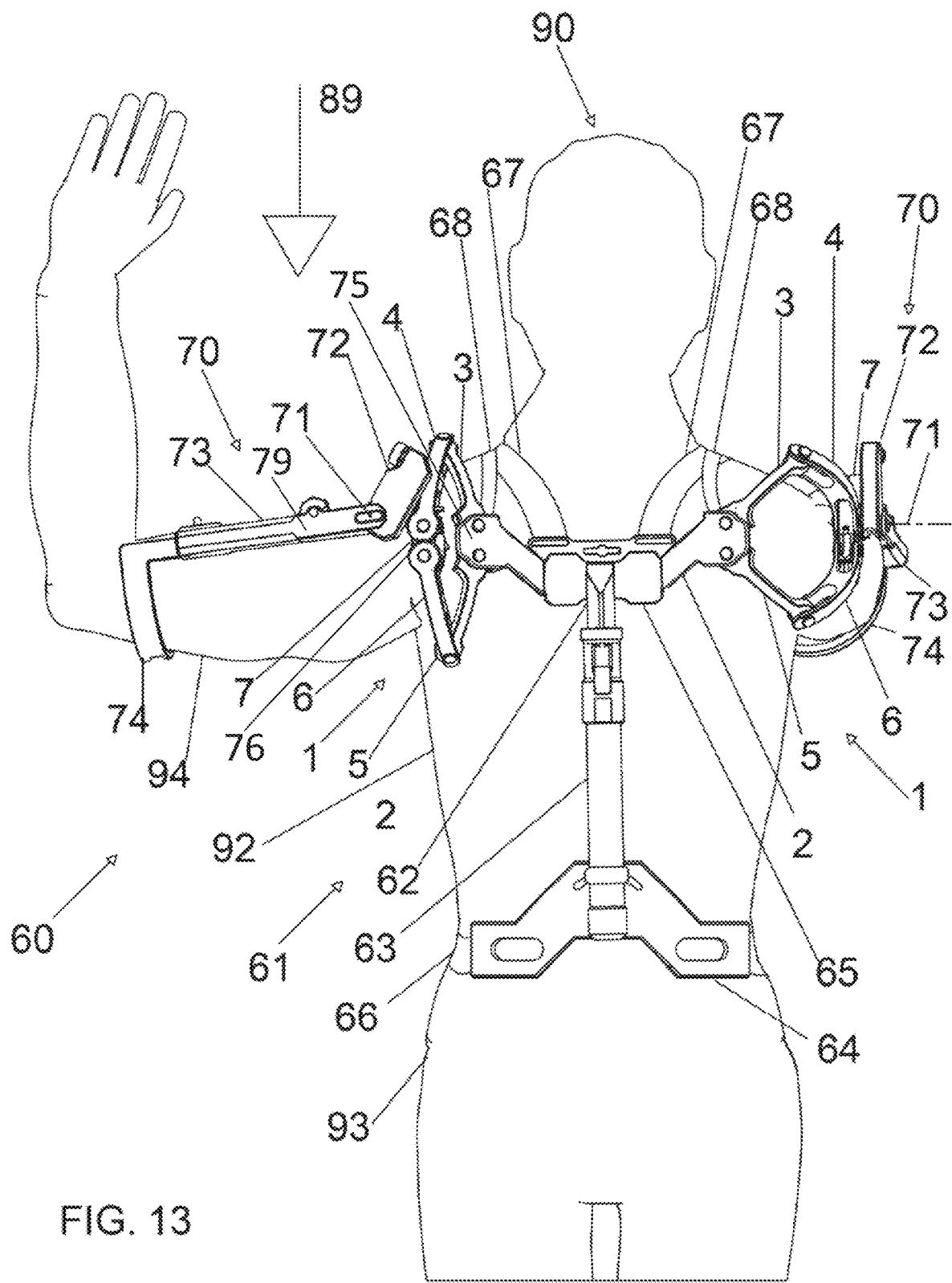
FIG. 13 shows a top view of the remote center joint providing a degree of freedom for a shoulder supporting exoskeleton.

In some embodiments as shown in FIG. 12 and FIG. 13, remote center joint 1 may be used as part of shoulder supporting exoskeleton 60. Shoulder supporting exoskeleton 60 may also be referred to as arm supporting exoskeleton 60. In one embodiment, remote center joint 1 is used to provide motion between torso frame 61 coupled to person's torso 92 and arm segment 70 coupled to person's upper arm 94. In some embodiments, arm segment 70 is a shoulder supporting actuator configured to at least partially support the gravitational effects due to the weight of the arm about the shoulder joint. In some embodiments, the motion provided by remote center joint 1 as a part of shoulder supporting exoskeleton 60 corresponds to relatively horizontal motions of upper arm 94 of person 90 while arm segment 70 provides motion for or applies a supportive force to relatively vertical motions of upper arm 94 of person 90. When shoulder supporting exoskeleton 60 is worn by person 90, imaginary axis 15 created by remote center joint 1 passes approximately through the shoulder joint of person 90 while the hardware remains behind or to the side of the body of person 90. This allows arm segment 70 to move relative to torso frame 61 about an axis that approximately coincides with the shoulder joint of person 90 to provide a natural range of motion and minimize relative motion between shoulder supporting exoskeleton 60 and upper arm 94 of person 90 or torso 92 of person 90. Approximately through the shoulder joint of person 90 may mean that an axis crosses through the body of the person near the shoulder joint, scapula, or upper arm. Additionally, this configuration allows for all needed hardware to be placed behind or to the side of person 90, without any hardware being located above the shoulder of person 90 or next to a head 91 of person 90. The passive motion of remote center joint 1 is controlled by forces from upper arm 94 of person 90 being transferred through arm segment 70 to terminal segment 7 while base segment 2 is fixed to torso frame 61 which is in turn fixed to torso 92 of person 90. Supportive forces and torques that are applied to upper arm 94 of person 90 from the arm segment 70 are transferred through remote center joint 1 to torso frame 61, which in turn applies the forces and torques to torso 92 of person 90 and hips 93 of person 90. In some embodiments, multiples of remote center joint 1 may be used as part of shoulder supporting exoskeleton 60. In the primary embodiment shoulder supporting exoskeleton 60 comprises a torso frame 61, a left remote center joint 1 coupled to torso frame 61, a left arm segment 70 coupled to left remote center joint 1, a right remote center joint 1 coupled to torso frame 61, and right arm segment 70 coupled to right remote center joint 1, wherein torso frame 61 is configured to be coupled to torso 92 of person 90, left arm segment 70 is configured to be coupled to upper arm 94 of person 90 on the left side, and right arm segment 70 is configured to be coupled to upper arm 94 of person 90 on the right side.

FIG. 13 shows a rear view of remote center joint 1 as part of shoulder supporting exoskeleton 60. Remote center joint 1 is configured to rotate terminal segment 7, coupled to upper arm 94 of person 90, relative to base segment 2, coupled to torso 92 of person 90, along imaginary axis 15 passing through the body of person 90. Remote center joint 1 comprises first segment 3 rotatably coupled to base segment 2 along first axis 16. Second segment 4 is rotatably coupled to first segment 3 about second axis 17 which intersects first axis 16 at first point 22. Second segment 4 is rotatably coupled to terminal segment 7 about third axis 18 which intersects first point 22. Third segment 5 is rotatably coupled to base segment 2 about fourth axis 19 parallel to first axis 16. Third segment 5 is geared to the first segment 3 with a first set of intermeshing gears 75. Fourth segment 6 is rotatably coupled to third segment 5 about fifth axis 20 which intersects fourth axis 19 at second point 23. Fourth segment 6 is rotatably coupled to terminal segment 7 along sixth axis 21 which intersects second point 23. Fourth segment 6 is geared to second segment 4 with a second set of intermeshing gears 76. Imaginary axis 15 of rotation of terminal segment 7 relative to base segment 2 is a line connecting first point 22 and second point 23.

In some embodiments, remote center joint 1 is configured to provide horizontal shoulder motion for shoulder supporting exoskeleton 60 wherein base segment 2 is coupled to torso frame 61 of shoulder supporting exoskeleton 60 and terminal segment 7 is coupled to arm segment 70 of shoulder supporting exoskeleton 60. When person 90 is standing upright, remote center joint 1 provides motion along imaginary axis 15 substantially parallel to gravity line 89. In this embodiment, when person 90 is standing upright, remote center joint 1 transfers a weight of the arm segment 70 to the torso frame 61 without affecting motion of terminal segment 7 relative to base segment 2. Similarly, when the person 90 is standing upright, remote center joint 1 accommodates for a horizontal motion of the upper arm 94 of person 90 between arm segment 70 and torso frame 61 when the arm supporting exoskeleton 60 is worn by the person 90.

In some embodiments, when person 90 is standing upright, as a part of shoulder supporting exoskeleton 60 remote center joint 1 provides motion along imaginary axis 15 skew to gravity line 89 to bias the motion of upper arm 94 of person 90 relative to torso 92 of person 90.

In some embodiments, torso frame 61 further comprises shoulder straps 67 that at least partially encircle a person's s torso 92, and belt 66 that at least partially encircles hips 93 of person 90 to couple shoulder supporting exoskeleton 60 to person 90. Remote center joint 1 may further comprise anchor strap 68 coupled to base segment 2 at its first end and configured to couple to shoulder strap 67 from its second end. Anchor strap 68 may be tightened to better secure remote center joint 1 to person 90. In other embodiments, anchor strap 68 may be coupled to base segment 2 from both ends, and be configured to at least partially encircle persons shoulder, upper arm 94 of person 90, or torso 92 of person 90.

Torso frame 61 may further comprise lower spine 63 and upper spine 62. To adjust the position of remote center joint 1 relative to belt 66, the location of upper spine 62 may be adjusted and held in place relative to lower spine 63 along the major axis of lower spine 63. This adjustment may be used to adjust the exoskeletons to persons of different height in order to align support axis 71 of arm segment 70 with persons shoulder joint. The shoulder joint of person 90 may refer to any area around the shoulder including but not limited to the glenohumeral joint, scapula, humerus, and clavicle. In some embodiments, torso frame 61 further comprises hip frame 64 coupled to both ends of belt 66 from its distal sides and to lower spine 63 from its center. Hip frame 64 may be configured to transfer forces from torso frame 61 to hips 93 of person 90.

Torso frame 61 may further comprise spine mount 65 located substantially behind torso 92 of person 90. In some embodiments, remote center joint 1 is adjustably coupled to spine mount 65 along an axis perpendicular to the major axis of upper spine 62 or lower spine 63. Remote center joint 1 may be moved and fixed in place relative to spine mount 65 in order to adjust for the size of person 90 to better align imaginary axis 15 of rotation with the persons shoulder joint. In other embodiments, remote center joint 1 may be rotationally coupled to torso frame 61 about an axis substantially parallel to imaginary axis 15 created between first point 22 and second point 23. This rotational coupling may occur between base segment 2 and spine mount 65, or base segment 2 may comprise two separate segments capable of rotation relative to each other. A rotational coupling between remote center joint 1 and torso frame 61 may be used to extend the range of motion of arm segment 70 relative to torso frame 61. In other embodiments, remote center joint 1 may be prismatically coupled to torso frame 61 along a direction perpendicular to imaginary axis 15 created between first point 22 and second point 23. A prismatic coupling between remote center joint 1 and torso frame 61 may be used to extend the range of motion of arm segment 70 relative to torso frame 61 or to dynamically adjust the alignment of imaginary axis 15 created between first point 22 and second point 23 with the shoulder joint of person 90. Still in other embodiments, remote center joint 1 may be coupled to torso frame 61 with a resilient member configured to deform under load and return to its original position when the load is removed. The resilient member may be configured to increase the range of motion between arm segment 70 and torso frame 61. In another embodiment remote center joint 1 may be rotationally coupled to arm segment 70. This may occur through a rotational coupling between terminal segment 7 and arm segment 70, or terminal segment 7 may comprise two independent segments capable of rotating relative to each other. A rotational coupling between remote center joint 1 and arm segment 70 may be used to extend the range of motion of arm segment 70 relative to torso frame 61. It may be understood by one skilled in the art that the rotational couplings between remote center joint 1 and torso frame 61 or arm segment 70 may comprise a spring or magnets to bias motion or hard stops to limit motion as described in regards to the motion of the remote center joint above.

In some embodiments, arm segment 70 comprises proximal segment 72 coupled to terminal segment 7 of remote center joint 1, distal segment 73 rotatably coupled to proximal segment 72 about support axis 71, and arm brace 74 coupled to distal segment 73. In other embodiments, arm segment 70 comprises distal segment 73 configured to rotate relative to terminal segment 7 about support axis 71 orthogonal to the imaginary axis 15, wherein the support axis 71 crosses approximately through the shoulder joint of the person 90, and torque generator 79 coupled to the distal segment 73 configured to apply a torque about the support axis 71 such that the distal segment 73 applies a force to the person's arm. Still in other embodiments, arm segment 70 further comprises proximal segment 72 configured to be coupled to terminal segment 7, and distal segment 73 configured to rotate relative to proximal segment 72 about support axis 71 that crosses approximately through the shoulder joint of person 90 orthogonal to imaginary axis 15, wherein distal segment 73 is configured to attach to the arm of person 90, and torque generator 79 coupled to proximal segment 72 from its first end and to distal segment 73 from its second end, the torque generator 79 configured to apply a torque about support axis 71 such that distal segment 73 applies a force to the person's arm to at least partially support the weight of the person's arm.

A torque generator 79 may include a motor, spring, pneumatic, hydraulic or other type of torque or force creating actuator. Torque generator 79 is attached to distal segment 73 from its first end and may be attached to terminal segment 7 or proximal segment 72 from its second end. In other embodiments, torque generator 79 remotely actuates distal segment 73 about support axis 71 and it attached to distal segment 73 from its first end and to any other component of remote center joint 1 or torso frame 61 from its second end, the forces being transferred to distal segment 73 through a Bowden cable or similar device.

In some embodiments, arm segment 70 is configured to create a torque between proximal segment 72 and distal segment 73 about support axis 71 in order to at least partially support the weight of upper arm 94 of person 90. This torque is applied to upper arm 94 of person 90 by arm brace 74, and reaction forces and torques are applied to remote center joint 1 through proximal segment 72. Remote center joint 1 transfers vertical forces from arm segment 70 to torso frame 61 which is configured to apply the loads to the hips of person 90. Horizontal components of torques from arm segment 70 in turn cause terminal segment 7 to rotate relative to base segment 2 about imaginary axis 15. In some embodiments of remote center joint 1, arm segment 70 is configured to apply a torque to arm of person 90 about support axis 71 orthogonal to imaginary axis 15, wherein reaction forces from the torque that do not create a moment about imaginary axis 15 are transferred through remote center joint 1 to torso frame 61 without affecting motion of terminal segment 7 relative to base segment 2.

Figure 14:
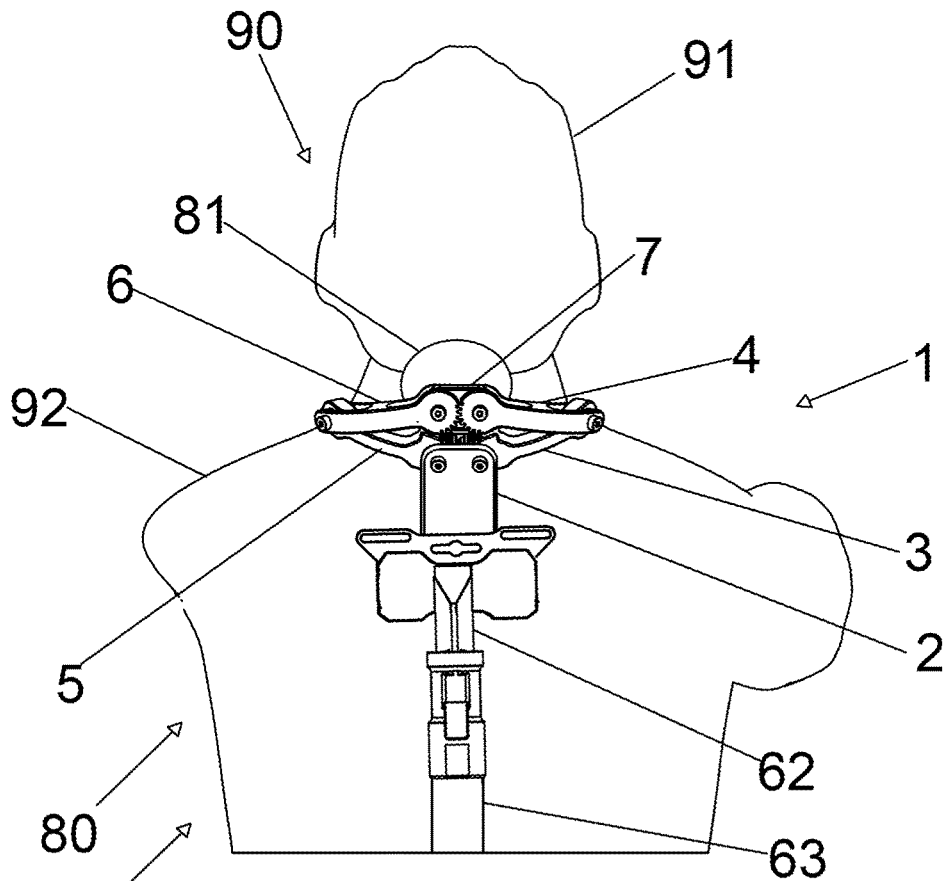
FIG. 14 shows the remote center joint providing a degree of freedom for a neck supporting exoskeleton when the persons neck is extended.
Figure 14:
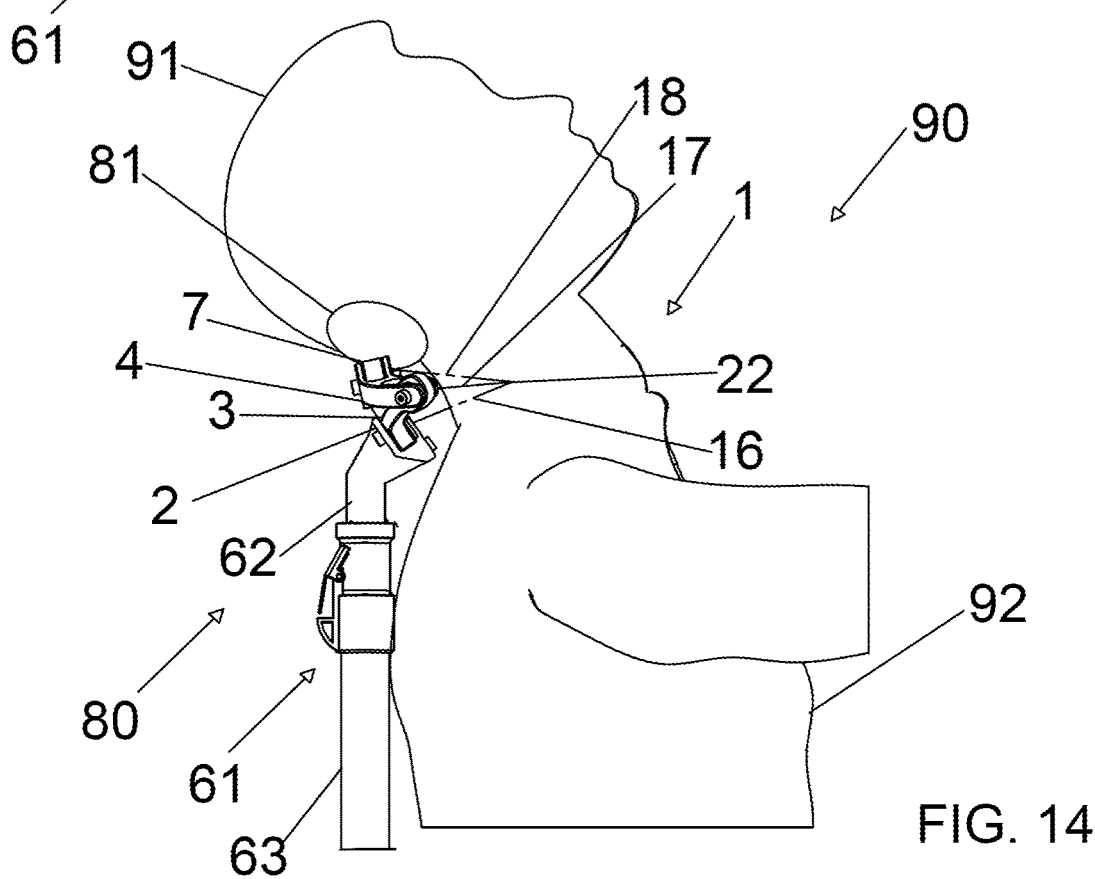

In some embodiments, support axis 71 is orthogonal to imaginary axis 15 created between first point 22 and second point 23. As upper arm 94 of person 90 moves horizontally, orthogonal to gravity line 89, remote center joint 1 maintains support axis 71 passing approximately through persons shoulder joint. In FIG. 13 and FIG. 14 a top view and back view of person 90 can be seen where persons left arm is oriented to persons side and persons right arm is oriented in front of person 90. It can be seen that when upper arm 94 of person 90 is oriented to the side of person 90, remote center joint 1 moves into a flexed position, as with persons left arm. It can also be seen that when upper arm 94 of person 90 is oriented in front of person 90, remote center joint 1 moves into an extended position, as with persons right arm. Remote center joint 1 moves to allow arm segment 70 to move in unison with upper arm 94 of person 90 while torso frame 61 remains fixed to torso 92 of person 90.

In some embodiments, arm brace 74 is adjustably coupled to distal segment 73 to adjust the position of arm brace 74 relative to support axis 71 in order to adjust for the length of upper arm 94 of person 90. Arm brace 74 may be attached to upper arm 94 of person 90 through an arm strap. In other embodiments the orientation of proximal segment 72 can be adjusted relative to remote center joint 1 about an axis parallel to support axis 71 to adjust the support provided by arm segment 70 to person 90. Still in other embodiments the orientation of proximal segment 72 can be adjusted relative to remote center joint 1 about an axis orthogonal to imaginary axis 15 connecting first point 22 and second point 23 to adjust the support provided by arm segment 70 to person 90. In some embodiments, arm segment 70 is rotatably coupled to remote center joint 1 about an axis parallel to imaginary axis 15 connecting first point 22 and second point 23 to increase the range of motion of arm segment 70 relative to torso frame 61.

Figure 15:
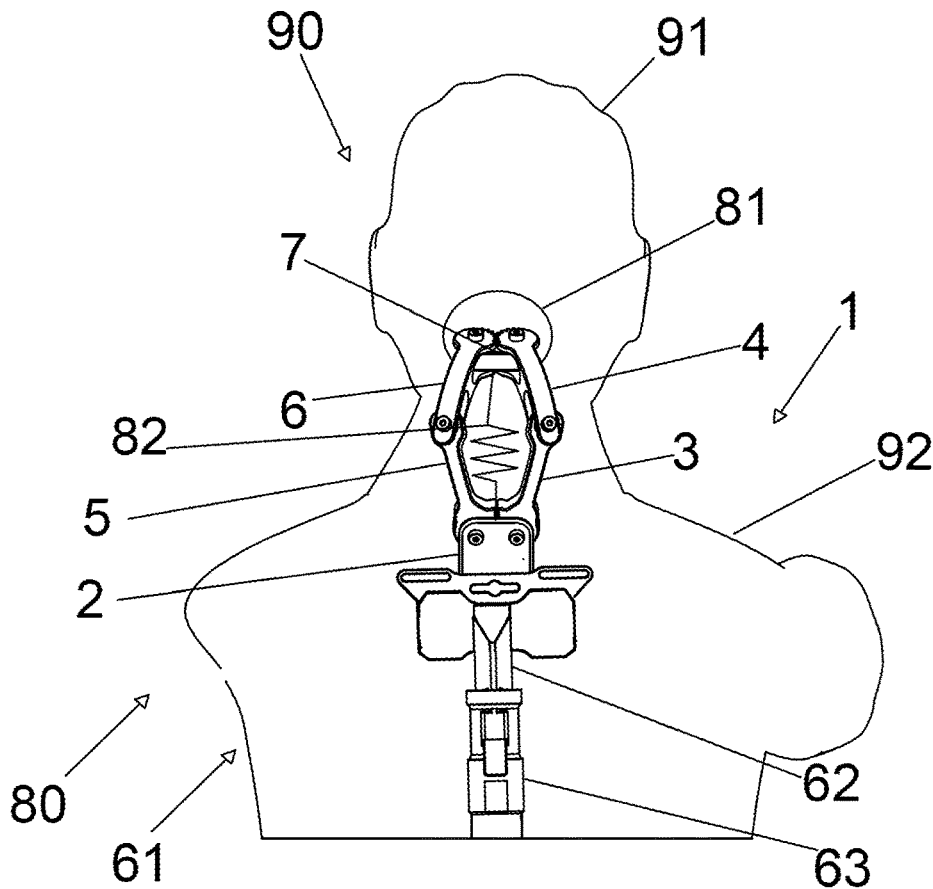
FIG. 15 shows the remote center joint providing a degree of freedom for a neck supporting exoskeleton when the persons neck is neutral.
Figure 15:
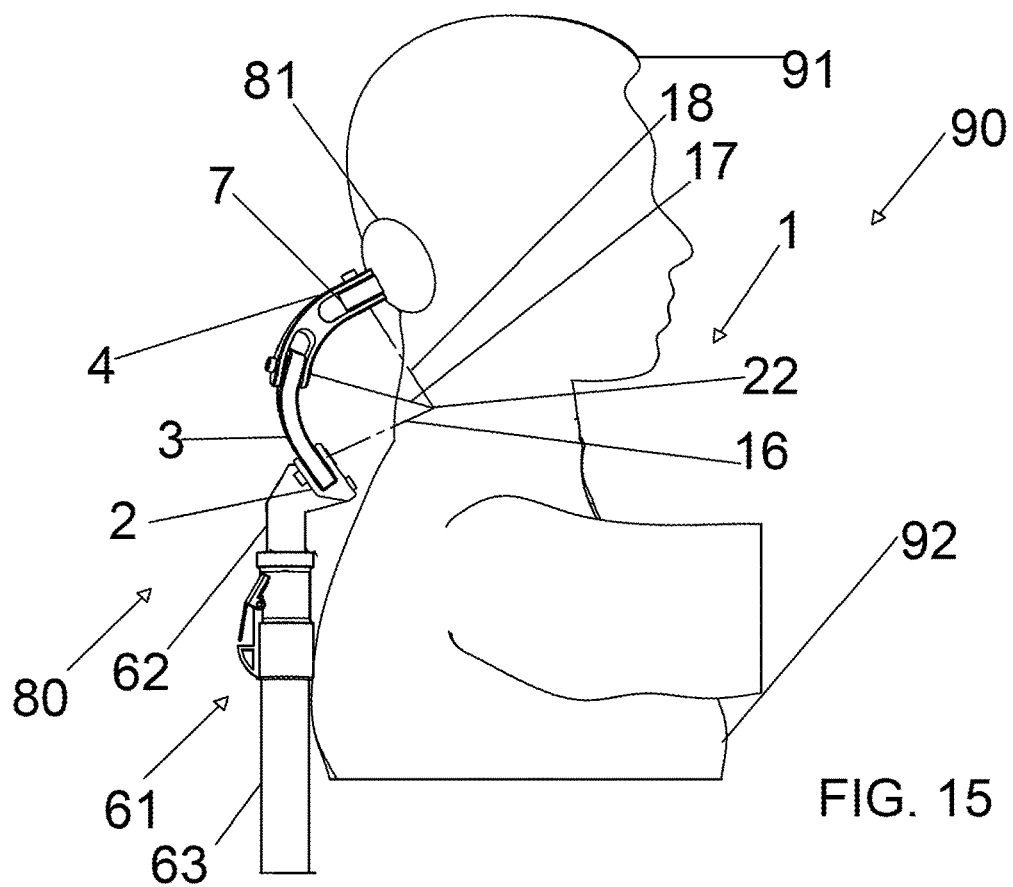

In some embodiments, as shown in FIG. 14 and FIG. 15, remote center joint 1 may be used as part of neck supporting exoskeleton 80. Neck supporting exoskeleton 80 may be used to at least partially support the weight of the head 91 of person 90 as it moves relative to torso 92 of person 90. Neck supporting exoskeleton 80 may further comprise torso frame 61 coupled to remote center joint 1 and configured to couple to torso 92 of person 90, and head pillow 81 coupled to remote center joint 1 and configured to contact the head 91 of person 90. In use, remote center joint 1 may be configured to create imaginary axis 15 between first point 22 and second point 23 that passes approximately through persons neck. When the head 91 of person 90 rotates relative to torso 92 of person 90, remote center joint 1 moves head pillow 81 relative to torso frame 61 about an axis substantially aligned with persons biological spine to prevent relative motion between head pillow 81 and the head 91 of person 90 to reduce discomfort due to chafing. In FIG. 14 it can be seen that person's head 91 is rotated backwards relative to torso 92 of person 90, as if person 90 was looking upwards, forcing remote center joint 1 into a flexed position. Here, imaginary axis 15 between first point 22 and second point 23 passes through persons neck. In FIG. 15 it can be seen that person's head 91 is rotated forwards relative to FIG. 14 relative to torso 92 of person 90, as if person 90 was looking forward, forcing remote center joint 1 into an extended position. Here, imaginary axis 15 between first point 22 and second point 23 remains passing through persons neck.

Base segment 2 may be coupled to torso frame 61 which is coupled to torso 92 of person 90. On of skill in the art may understand that for the neck supporting exoskeleton 80, upper spine 62 may be coupled to torso 92 of person 90 in a manner equivalent to that discussed above for shoulder supporting exoskeleton 60. Terminal segment 7 may be coupled to head pillow 81 configured to contact the head 91 of person 90 and apply a supportive force.

In some embodiments as shown in FIG. 15, remote center joint 1 may further comprise spring 82 coupled between at least two segments. Spring 82 may be configured to bias remote center joint 1 into an extended position. When the head 91 of person 90 rotates backwards relative to torso 92 of person 90, spring 82 causes remote center joint 1 to resist the motion of head pillow 81 relative to torso frame 61 to at least partially support the weight of the head 91 of person 90. When the head 91 of person 90 rotates forwards relative to torso 92 of person 90, spring 82 causes remote center joint 1 to assist the motion of head pillow 81 relative to torso frame 61 to at least partially support the weight of the head 91 of person 90. One of skill in the art may appreciate that as a part of a neck supporting exoskeleton 80, remote center joint 1 may be configured to support sideways or forward rotation of the head 91 of person 90 relative to torso 92 of person 90 instead of rearwards motion.

FIG. 16 and FIG. 17 shows an embodiment of remote center joint 1 configured to accommodate bi-directional spinal twisting motion of torso 92 of person 90 relative to hips 93 of person 90. This may be used as a part of shoulder supporting exoskeleton 60, neck supporting exoskeleton 80, or any other type of wearable device such as a back-supporting exoskeleton, backpack, load carriage device, etc. In this embodiment, remote center joint 1 is configured to create imaginary axis 15 between first point 22 and second point 23 passing through persons spine and oriented along the length of persons spine, parallel to gravity line 89 when person 90 is standing upright. In some embodiments, base segment 2 is fixed relative to persons lower torso and terminal segment 7 is fixed relative to persons upper torso. When person 90 performs a spinal twisting motion, terminal segment 7 tracks persons upper torso while base segment 2 remains fixed with persons lower torso. Persons upper torso may indicate motion of the rib cage, chest, shoulders, neck, or head. Persons lower torso may indicate motion of the pelvis or lumbar spine. When persons spine is in a neutral position, remote center joint 1 may be biased into a flexed position as shown in FIG. 16. When persons spine is twisted to the right or the left, remote center joint 1 may be biased into an extended position as shown in FIG. 17. While accommodating for twisting motion of persons pine, remote center joint 1 may transfer forces and toques between terminal segment 7 and base segment 2.

As can be seen in FIG. 16 and FIG. 17, each segment of remote center joint 1 may consist of one link, with the joints between them arranged in a single supported fashion. This allows each link to overlap with the connected linkages so that remote center joint 1 may extend in two directions about imaginary axis 15 between first point 22 and second point 23. A consequence of this is that when first axis 16 aligns with third axis 18 and fourth axis 19 aligns with sixth axis 21 as shown in FIG. 16, a singularity occurs where first segment 3 can rotate relative to third segment 5 without any motion between base segment 2 and terminal segment 7. To avoid this singularity as shown in FIG. 17, remote center joint 1 may further comprise first magnet 42 coupled to any of the segments, and second magnet 43 coupled to any other segment, wherein first magnet 42 and second magnet 43 are configured to bias remote center joint 1 away from a position in which first axis 16 aligns with third axis 18 and fourth axis 19 aligns with sixth axis 21. First magnet 42 and second magnet 43 in this orientation will toggle remote center joint 1 around this singularity position. In some embodiments, first magnet 42 is positioned in line with first axis 16 and second magnet 43 is positioned in line with third axis 18, wherein first magnet 42 is configured to repel second magnet 43. One of skill in the art may understand that first magnet 42 and second magnet 43 can similarly be placed in line with fourth axis 19 and sixth axis 21, respectively.

One of skill in the art may understand that the embodiments of remote center joint 1 described herein may be use in many applications. In the field of exoskeletons, remote center joint 1 may be used for any other body motion. In addition to those described above, remote center joint 1 may be used to allow an exoskeleton to move with a person during motions including but not limited to internal/external shoulder rotation, internal/external hip rotation, wrist pronation/supination, finger flexion, ankle pronation/supination, spinal flexion, or spinal side bending. In addition to the exoskeleton field, one of skill in the art may utilize remote center joint 1 for applications in robotics, surgical equipment, tool mounting equipment, or any other device or mechanism where one end must rotate relative to another.

ASPECTS

Terminology and Numbering

1. Remote center joint
2. Base segment (torso segment)
3. First segment
4. Second segment
5. Third segment
6. Fourth segment
7. Terminal segment (arm segment)
8. Second base segment?
9. Fifth segment
10. Sixth segment
11. Seventh segment
12. Eighth segment
13. Second terminal segment
14. Joint rotation angle
15. Imaginary axis 15
16. First axis
17. Second axis
18. Third axis
19. Fourth axis
20. Fifth axis
21. Sixth axis
22. First point 23. Second point
24.
25. Seventh axis
26. Eighth axis
27. Ninth axis
28. Tenth axis
29. Eleventh axis
30. Twelfth axis
31. Third point
32. Fourth point
33. Second imaginary axis
34. Curve profile
35. Arc angle
36. First Distance
37. Second Distance
38.
39.
40. Extension hard stop
41. Flexion hard stop
42. First magnet
43. Second magnet
44. Stow magnet
45. Stow switch
46.
47.
48.
49.
50.
51.
52.
53.
54.
55.
56.
57.
58.
59.
60. Shoulder supporting exoskeleton
61. Torso frame
62. Upper spine
63. Lower spine
64. Hip frame
65. Spine mount
66. Belt
67. Shoulder straps
68. Anchor strap
69.
70. Arm segment
71. Support axis
72. Proximal segment
73. Distal segment
74. Arm brace
75.
76.
77.
78.
79.
80. Neck supporting exoskeleton
81. Head pillow
82. Spring
83.
84.
85.
86.
87.
88.
89. Gravity line
90. Person
91.
92. Head of the person
93. Persons torso
94. Hips
95. Upper arm

CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A remote-center joint for an arm supporting exoskeleton comprising:
    a base segment coupled to a torso frame of the arm supporting exoskeleton, wherein the torso frame is configured to be coupled to a torso of a person;
    a terminal segment coupled to an arm segment of the arm supporting exoskeleton, wherein the arm segment is configured to be coupled to an arm of the person;
    a first segment rotatably coupled to the base segment along a first axis;
    a second segment rotatably coupled to the first segment about a second axis, and
    rotatably coupled to the terminal segment about a third axis, wherein the first axis, second axis, and third axis intersect at a first point;
    a third segment rotatably coupled to the base segment along a fourth axis parallel to the first axis, wherein the third segment and the first segment are provided with a first set of intermeshing gears; and
    a fourth segment rotatably coupled to the third segment along a fifth axis, and rotatably coupled to the terminal segment along a sixth axis parallel to the third axis, wherein the fourth axis, the fifth axis, and sixth axis intersect at a second point, and
    wherein the fourth segment and the second segment are provided with a second set of intermeshing gears, wherein the remote-center joint rotates the arm segment relative to the torso frame about an imaginary axis connecting the first point and the second point that is configured to cross through a shoulder joint of the person.

2. The remote center joint of claim 1, wherein the imaginary axis is parallel to a gravity line when the person is standing upright such that the remote center joint transfers a weight of the arm segment to the torso frame without affecting motion of the terminal segment relative to the base segment.

3. The remote center joint of claim 1, wherein the imaginary axis is parallel to a gravity line when the person is standing upright such that the remote center joint is configured to accommodate a horizontal motion of an upper arm of the person between the arm segment and the torso frame when the arm supporting exoskeleton is worn by the person.

4. The remote center joint of claim 1, wherein the arm segment is configured to apply a torque to the arm of the person about a support axis orthogonal to the imaginary axis, wherein reaction forces from the torque that do not create a moment about the imaginary axis are transferred through the remote center joint to the torso frame without affecting motion of the terminal segment relative to the base segment.

5. The remote center joint of claim 1, wherein the arm segment further comprises a distal segment configured to rotate relative to the terminal segment about a support axis orthogonal to the imaginary axis, wherein the support axis is configured to cross through the shoulder joint of the person.

6. The remote center joint of claim 5, further comprising a torque generator coupled to the distal segment, wherein the torque generator is configured to apply a torque about the support axis such that the distal segment applies a force to the arm of the person.

7. The remote center joint of claim 1, wherein the arm segment further comprises:
a proximal segment configured to be coupled to the terminal segment;
a distal segment configured to rotate relative to the proximal segment about a support axis that crosses approximately through the shoulder joint of the person orthogonal to the imaginary axis, wherein the distal segment is configured to attach to the arm of the person; and
a torque generator coupled to the proximal segment from its first end and to the distal segment from its second end, the torque generator configured to apply a torque about the support axis such that the distal segment applies a force to the arm of the person to at least partially support a weight of the arm of the person.

8. The remote center joint of claim 1, wherein the imaginary axis is perpendicular to the first axis.

9. The remote center joint of claim 1, wherein a first segment arc angle is equal to a third segment arc angle and a second segment arc angle is equal a fourth segment arc angle such that a gear ratio between the first segment and the third segment is 1:1 and the gear ratio between the second segment and the fourth segment is 1:1.

10. The remote center joint of claim 9, wherein the first segment arc angle is not equal to the second segment arc angle.

11. The remote center joint of claim 9, wherein the first segment arc angle is equal to the second segment arc angle.

12. The remote center joint of claim 1, wherein the second segment is configured to overlap the first segment and the fourth segment is configured to overlap the third segment such that the remote center joint can rotate through a position in which the first axis becomes coincident with the third axis and the fourth axis becomes coincident with the fifth axis.

13. The remote center joint of claim 1, wherein at least one of the base segment, the terminal segment, the first segment, the second segment, the third segment, and the fourth segment comprises a first extension hard stop and another of the at least one of the base segment, the terminal segment, the first segment, the second segment, the third segment, and the fourth segment comprises a second extension hard stop, wherein at a fully extended position, the first extension hard stop and the second extension hard stop contact each other to prevent the remote center joint from increasing a joint rotation angle.

14. The remote center joint of claim 13, further comprising a first magnet coupled to the first extension hard stop and a second magnet coupled to the second extension hard stop, wherein the first magnet and the second magnet are configured to repel the first extension hard stop from the second extension hard stop.

15. The remote center joint of claim 1, wherein at least one of the base segment, the terminal segment, the first segment, the second segment, the third segment, and the fourth segment comprises a first flexion hard stop and another of the at least one of the base segment, the terminal segment, the first segment, the second segment, the third segment, and the fourth segment a second flexion hard stop, wherein at a fully flexed position, the first flexion hard stop and second flexion hard stop contact each other to prevent the remote center joint from reducing a joint rotation angle.

16. The remote center joint of claim 15, further comprising a first magnet coupled to the first flexion hard stop and a stow magnet coupled to the second flexion hard stop, wherein the first magnet and the stow magnet are configured to attract the first flexion hard stop to the second flexion hard stop.

17. The remote center joint of claim 16, further comprising a stow switch configured to move the stow magnet between a first position and a second position, wherein when the stow magnet is in the first position it comes into contact with the first magnet when the remote center joint is in the fully flexed position, thus applying a force to hold the remote center joint in the fully flexed position, and when the stow magnet is in the second position it does not come into contact with the first magnet when the remote center joint is in the fully flexed position and does not apply the force to hold the remote center joint in the fully flexed position.

18. The remote center joint of claim 1, further comprising a first magnet coupled to at least one of the base segment, the terminal segment, the first segment, the second segment, the third segment, and the fourth segment, and a second magnet coupled to any other of the at least one of the base segment, the terminal segment, the first segment, the second segment, the third segment, and the fourth segment, wherein the first magnet and the second magnet are configured to bias the remote center joint away from a position in which the first axis aligns with the third axis and the fourth axis aligns with the sixth axis.

19. The remote center joint of claim 1, further comprising a spring configured to act between at least two of the base segment, the terminal segment, the first segment, the second segment, the third segment, and the fourth segment, to bias motion of the terminal segment relative to the base segment.

20. A remote-center joint for an arm supporting exoskeleton comprising:
a base segment coupled to a torso frame of the arm supporting exoskeleton, wherein the torso frame is configured to be coupled to a torso of a person;
a terminal segment coupled to an arm segment of the arm supporting exoskeleton, wherein the arm segment is configured to be coupled to an arm of the person;
a first segment and a third segment each rotatably coupled to the base segment about parallel axes, wherein the first segment and the third segment are geared together;
and a second segment and a fourth segment each rotatably coupled to the terminal segment about parallel axes, wherein the second segment and the fourth segment are geared together, wherein the second segment is rotatably coupled to the first segment and the third segment is rotatably coupled to the fourth segment such that the remote-center joint rotates the arm segment relative to the torso frame about an imaginary axis that does not pass through any mechanical joint.

21. The remote center joint of claim 20, wherein the imaginary axis is configured to pass through a shoulder joint of the person.

22. The remote center joint of claim 20, wherein the imaginary axis is parallel to a gravity line when the person is standing upright such that the remote center joint transfers a weight of the arm segment to the torso frame without affecting motion of the terminal segment relative to the base segment.

23. The remote center joint of claim 20, wherein the imaginary axis is parallel to a gravity line when the person is standing upright such that the remote center joint is configured to accommodate a horizontal motion of an upper arm of a person between the arm segment and the torso frame.

24. The remote center joint of claim 20, wherein the arm segment is configured to apply a torque to the arm of the person about a support axis orthogonal to the imaginary axis, wherein reaction forces from the torque that do not create a moment about the imaginary axis are transferred through the remote center joint to the torso frame without affecting motion of the terminal segment relative to the base segment.

25. The remote center joint of claim 20, wherein the arm segment further comprises a distal segment configured to rotate relative to the terminal segment about a support axis orthogonal to the imaginary axis, wherein the support axis is configured to cross through a shoulder joint of the person.

26. The remote center joint of claim 25, further comprising a torque generator coupled to the distal segment, the torque generator configured to apply a torque about the support axis such that the distal segment applies a force to the arm of the person.

27. The remote center joint of claim 20, wherein the arm segment further comprises:
a proximal segment configured to be coupled to the terminal segment, a distal segment configured to rotate relative to the proximal segment about a support axis that is configured to cross through a shoulder joint of the person orthogonal to the imaginary axis, wherein the distal segment is configured to attach to the arm of the person, and
a torque generator comprises a first end and a second end, wherein the first end is coupled to the proximal segment and the second end is coupled to the distal segment, the torque generator configured to apply a torque about the support axis such that the distal segment is configured to apply a force to the arm of the person to at least partially support a weight of the arm of the person.

28. The remote center joint of claim 20, wherein the base segment is rotatably coupled to the torso frame about an axis parallel to the imaginary axis.

29. The remote center joint of claim 20, wherein the base segment is translationally coupled to the torso frame in a direction perpendicular to the imaginary axis.

30. The remote center joint of claim 20, wherein the terminal segment is rotatably coupled to the arm segment about an axis parallel to the imaginary axis.

* * * * *